US008086745B2

(12) United States Patent
Liew et al.

(10) Patent No.: US 8,086,745 B2
(45) Date of Patent: Dec. 27, 2011

(54) GRAPHICAL SYSTEM AND METHOD FOR USER AUTHENTICATION

(75) Inventors: Bee Yian Liew, Cupertino, CA (US);
Trista Chen, Menlo Park, CA (US);
Volker Roth, San Francisco, CA (US)

(73) Assignee: Fuji Xerox Co., Ltd, Tokyo (JP)

( * ) Notice: Subject to any disclaimer, the term of this patent is extended or adjusted under 35 U.S.C. 154(b) by 283 days.

(21) Appl. No.: 12/202,118

(22) Filed: Aug. 29, 2008

(65) Prior Publication Data

US 2010/0058437 A1    Mar. 4, 2010

(51) Int. Cl.
*G06F 15/16*    (2006.01)
*G06F 21/00*    (2006.01)

(52) U.S. Cl. ............ 709/229; 713/182; 713/183; 726/5

(58) Field of Classification Search .................. 726/5, 6, 726/18, 19; 713/182, 184, 183; 382/115; 709/229

See application file for complete search history.

(56) References Cited

U.S. PATENT DOCUMENTS

| 5,559,961 | A * | 9/1996 | Blonder .......................... 726/18 |
| 5,608,387 | A | 3/1997 | Davies |
| 5,892,838 | A * | 4/1999 | Brady .......................... 382/115 |
| 6,934,860 | B1 * | 8/2005 | Goldstein ..................... 713/183 |
| 6,981,016 | B1 | 12/2005 | Ryan |
| 7,174,462 | B2 * | 2/2007 | Pering et al. .................. 713/182 |
| 2002/0029341 | A1 * | 3/2002 | Juels et al. .................... 713/184 |
| 2004/0230843 | A1 * | 11/2004 | Jansen .......................... 713/202 |
| 2004/0250138 | A1 * | 12/2004 | Schneider ..................... 713/202 |
| 2005/0220345 | A1 | 10/2005 | Chiu et al. |
| 2005/0220348 | A1 | 10/2005 | Chiu et al. |
| 2006/0062455 | A1 | 3/2006 | Chiu et al. |
| 2006/0062456 | A1 | 3/2006 | Chiu et al. |
| 2009/0293119 | A1 * | 11/2009 | Jonsson .......................... 726/19 |
| 2009/0328175 | A1 * | 12/2009 | Shuster .......................... 726/7 |
| 2010/0043062 | A1 * | 2/2010 | Alexander et al. ................ 726/6 |
| 2010/0169958 | A1 * | 7/2010 | Werner et al. ..................... 726/6 |

OTHER PUBLICATIONS

R. N. Shepard, "Recognition memory for words, sentences and pictures", Journal of Verbal Learning and Verbal Behaviors, 6, pp. 156-163, 1967.
K. Pezdek et al., "Picture Memory: Recognizing Added and Deleted Details", Journal of Experimental Psychology: Learning, Memory and Cognition, vol. 14, No. 3, pp. 468-476, 1988.
R. Dhamija et al., "Déjà Vu: A User Study Using Images for Authentication", Proceedings of the 9th USENIX Security Symposium, 2000.

(Continued)

*Primary Examiner* — Aaron Strange
(74) *Attorney, Agent, or Firm* — Sughrue Mion, PLLC

(57) ABSTRACT

System and method for graphical user authentication using compact collages of regions of images. Image corpus is constructed by selecting similar quality images and filtering to further homogenize image quality. Regions are detected within the images and scored according to similarity and neighborhood information. Regions with lower scores provide less information about other regions and are more secure secrets. During enrollment, user selects secret images; decoy images are chosen by the system accordingly. Regions from secret images are selected as secrets according to the scoring of regions and regions from decoy images are selected as decoys. A collage is formed with secrets and decoys. Compact rendering enhances security and is suitable for small displays of mobile devices. Several rounds of challenge, requiring identification of secrets, are presented to the user. User is authenticated if a certain number of correct identifications of secrets within a number of rounds are achieved.

37 Claims, 26 Drawing Sheets

OTHER PUBLICATIONS

W. Moncur et al., "Pictures at the ATM: Exploring the usability of multiple graphical passwords", Proceedings of CHI 2007, Apr. 28-May 3, 2007.

E. Hayashi et al., "Mental Trapdoors for User Authentication on Small Mobile Devices", CMU CyLab Technical Report: CMU-CyLab-07-011, Aug. 12, 2007.

P. Chiu et al., "Stained Glass Photo Collages", UIST '04, 2004.

P. Chiu et al., "Stained-Glass Visualization for highly condensed video summaries", ICME '04, 2004.

Y. Deng et al., "Unsupervised segmentation of color-texture regions in images and video", IEEE Transactions on Pattern Analysis and Machine Intelligence, Aug. 2001.

T. Cour et al., "Spectral Segmentation with Multiscale Graph Decomposition", IEEE International Conference on Computer Vision and Pattern Recognition (CVPR), 2005.

* cited by examiner

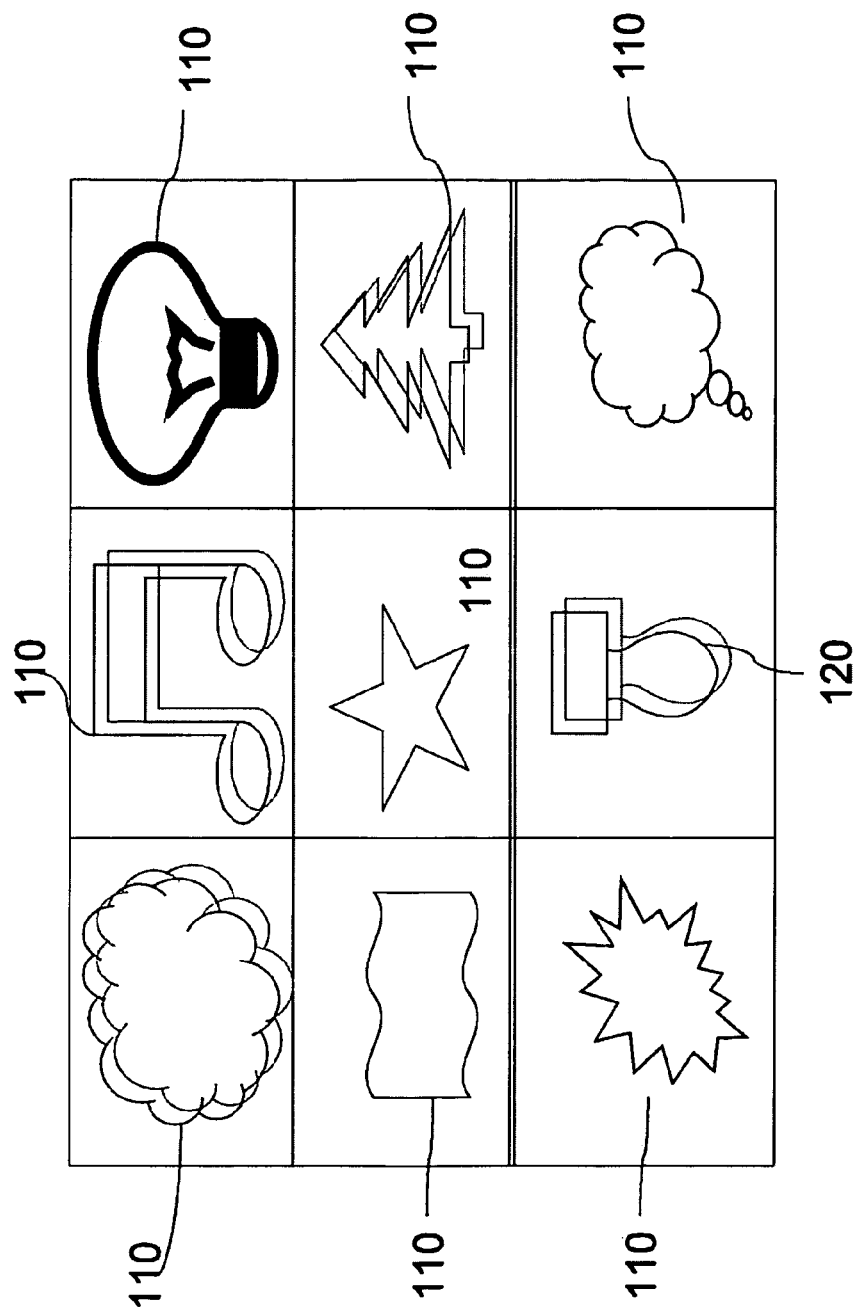

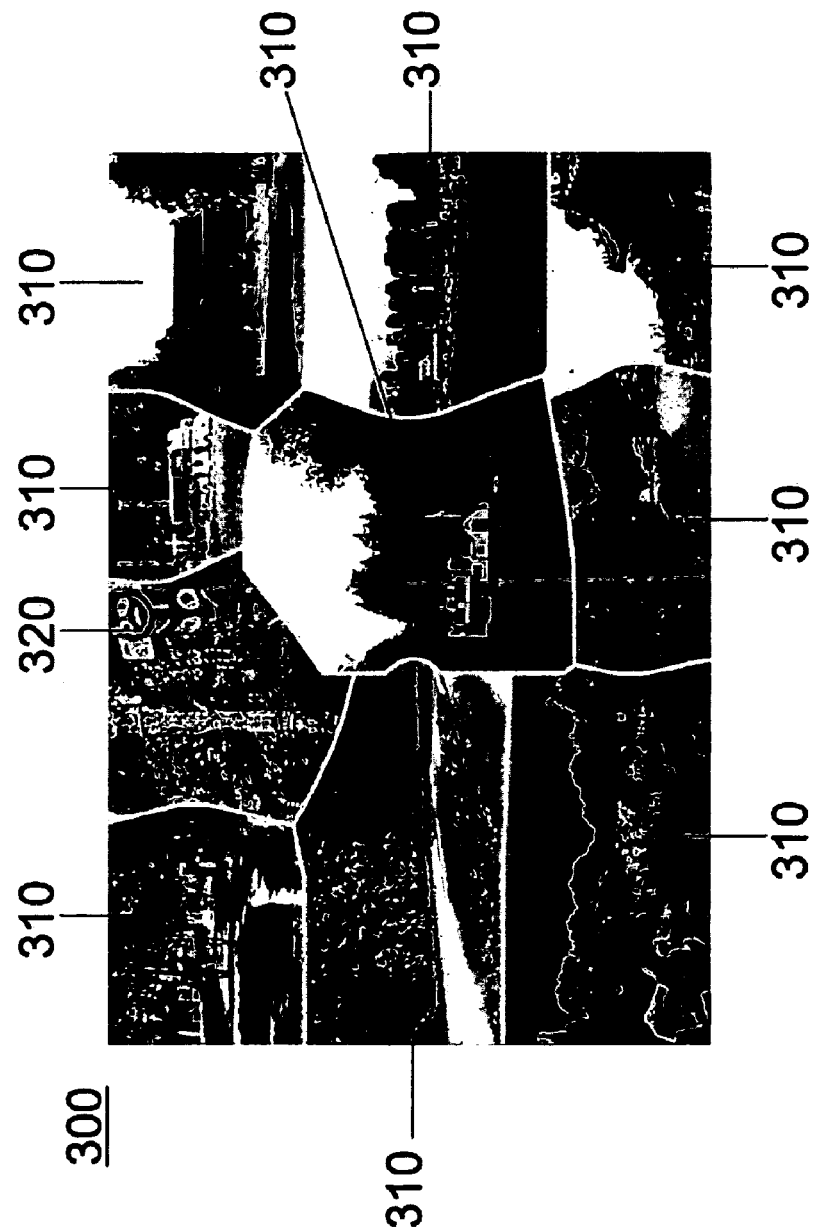

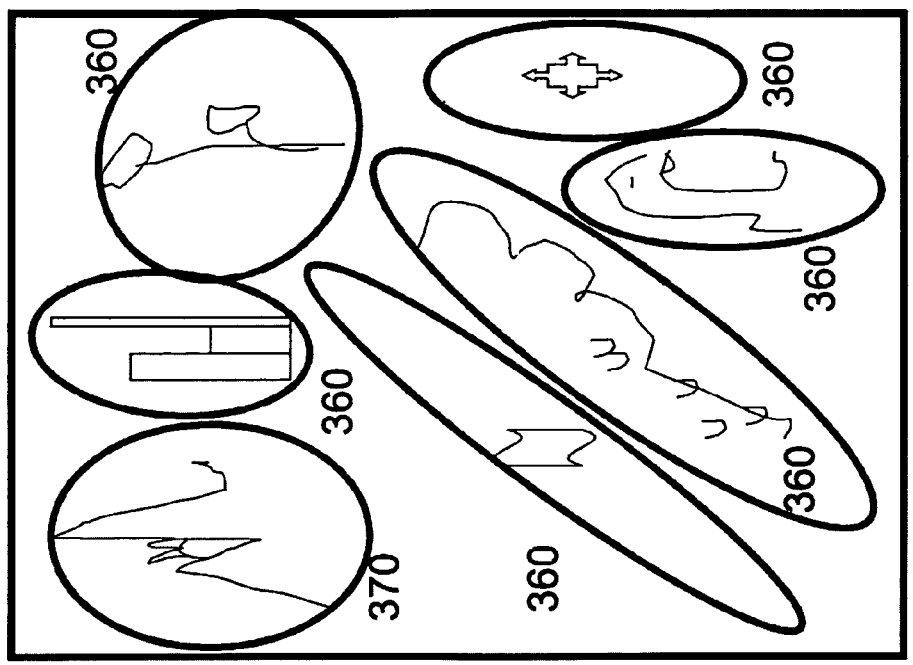

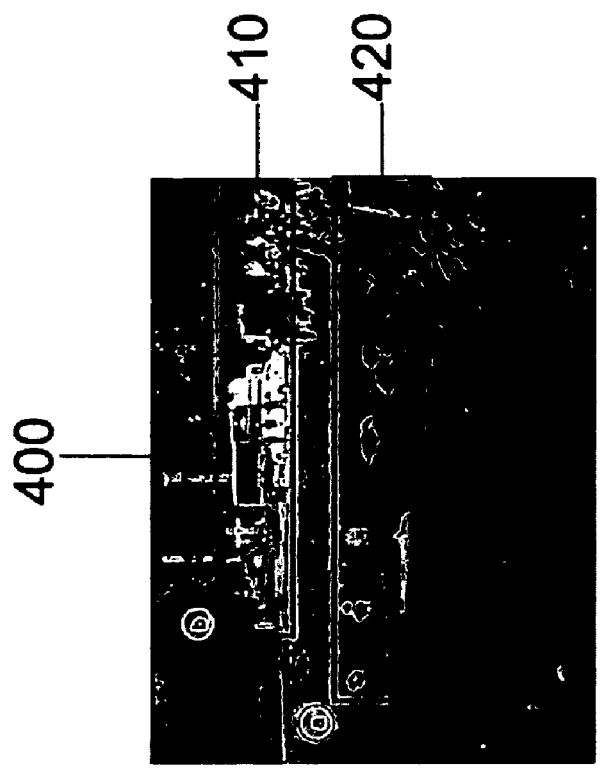
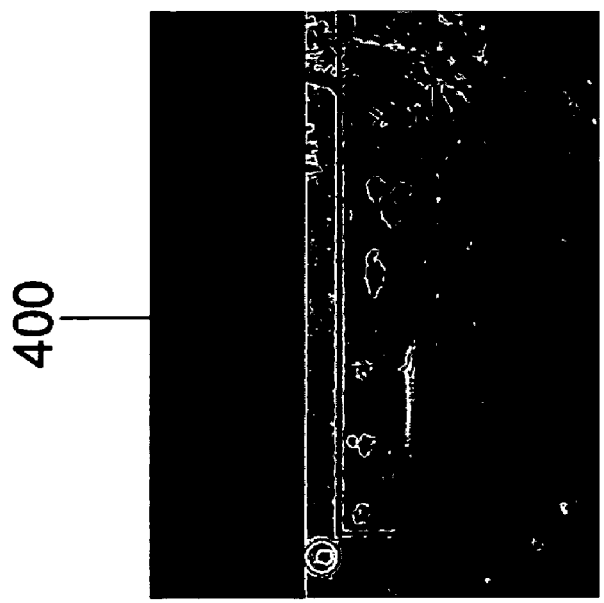
Figure 4A

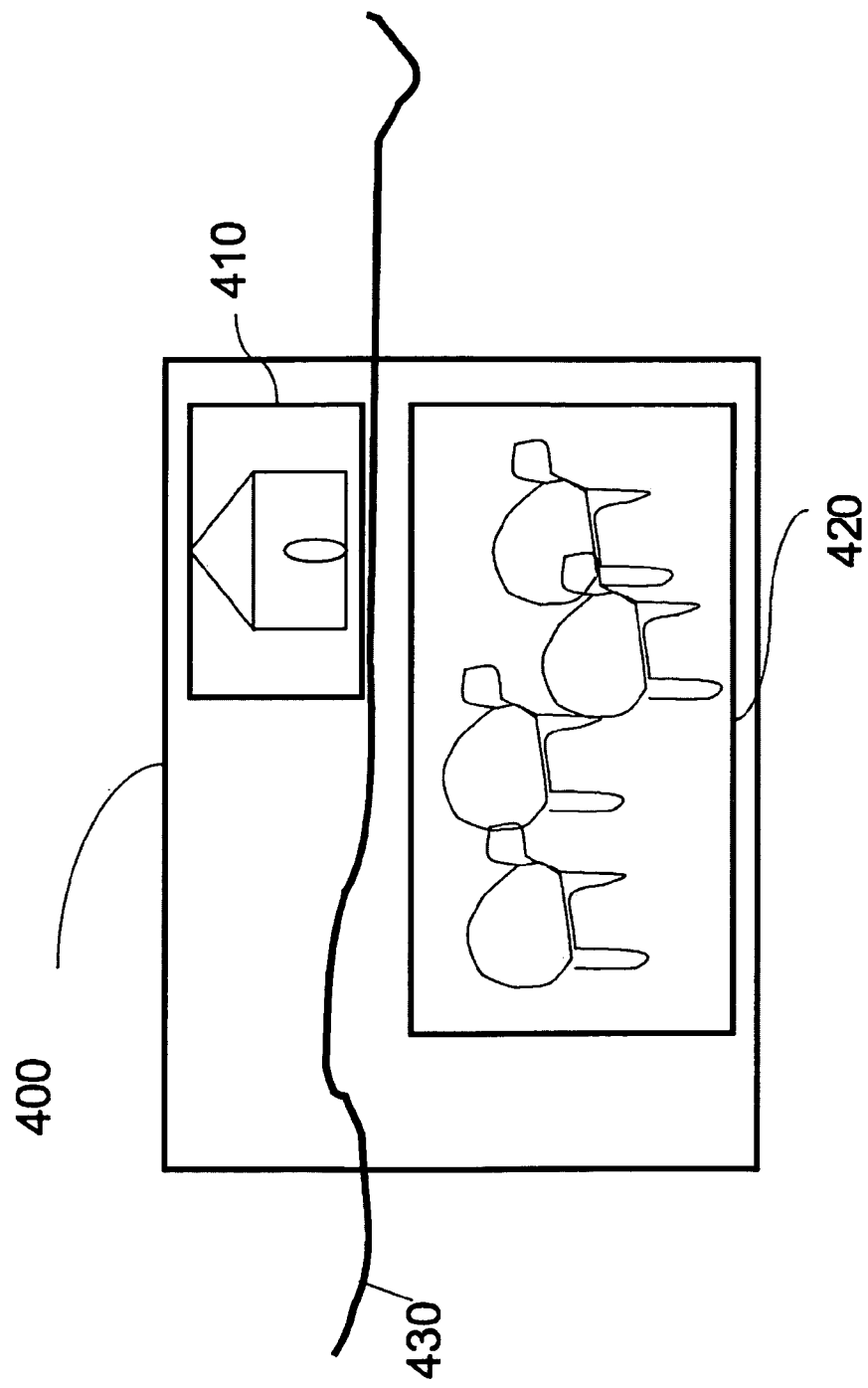

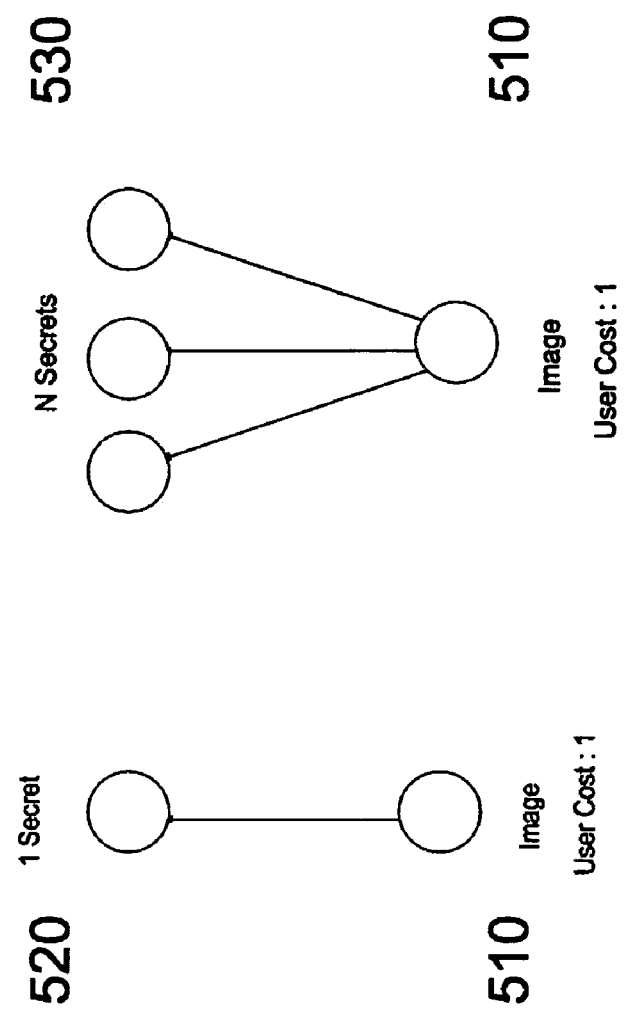

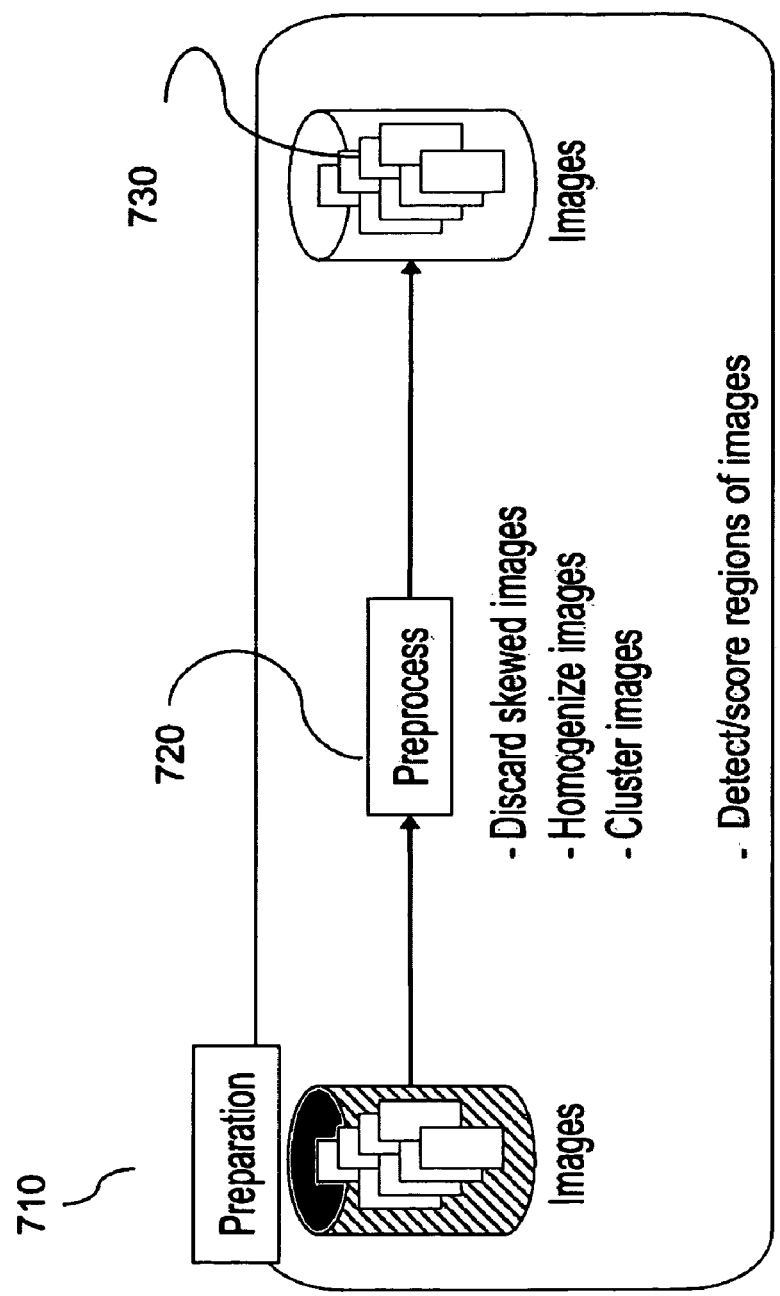

$a_i$ and $a_j$ are radii of neighboring regions i and j $c_i$ and $c_j$ are centers of neighboring regions i and j where $h_i$ is the number of neighboring regions of region i $$/ h_i^2$$

If $L \geq (a_i + a_j)$

If $L < (a_i + a_j)$

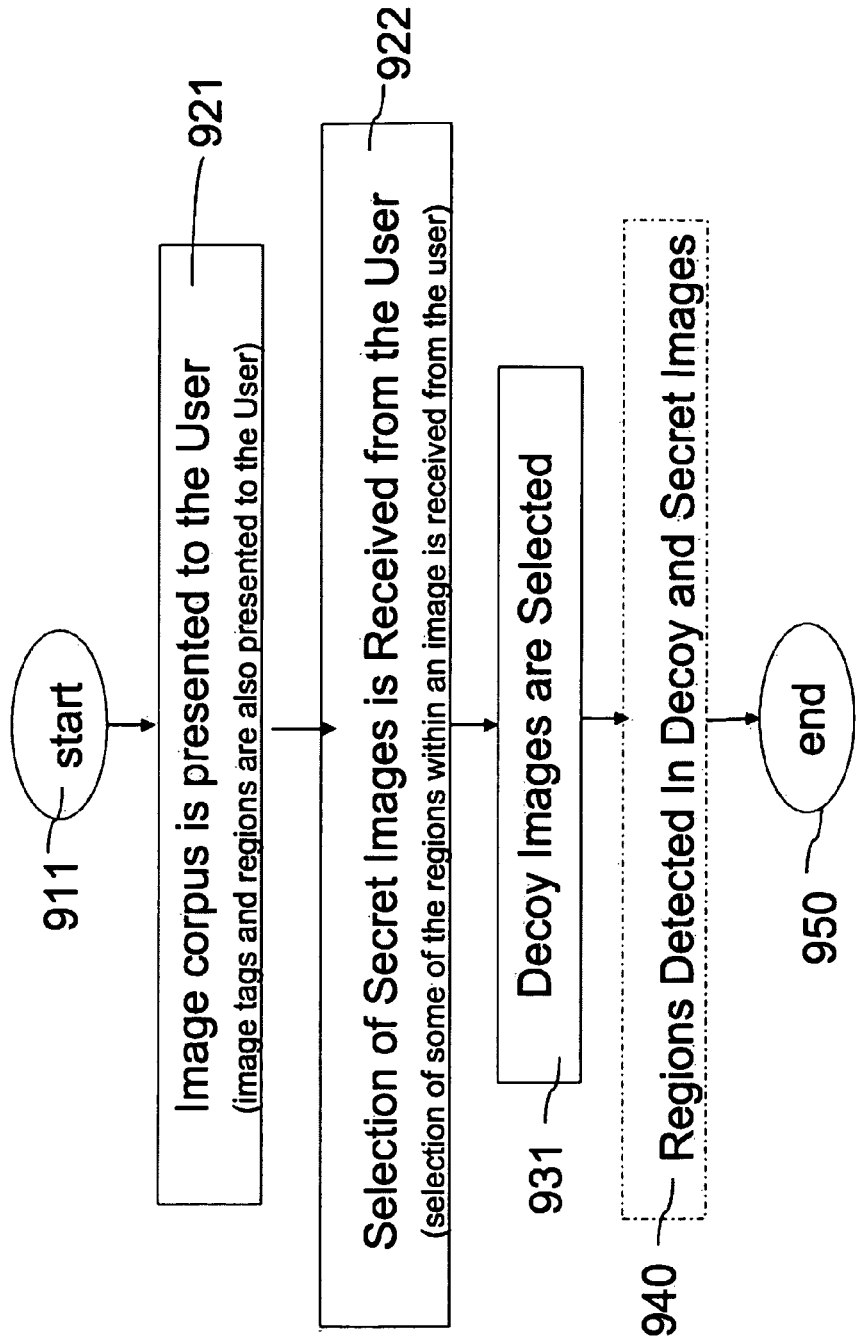

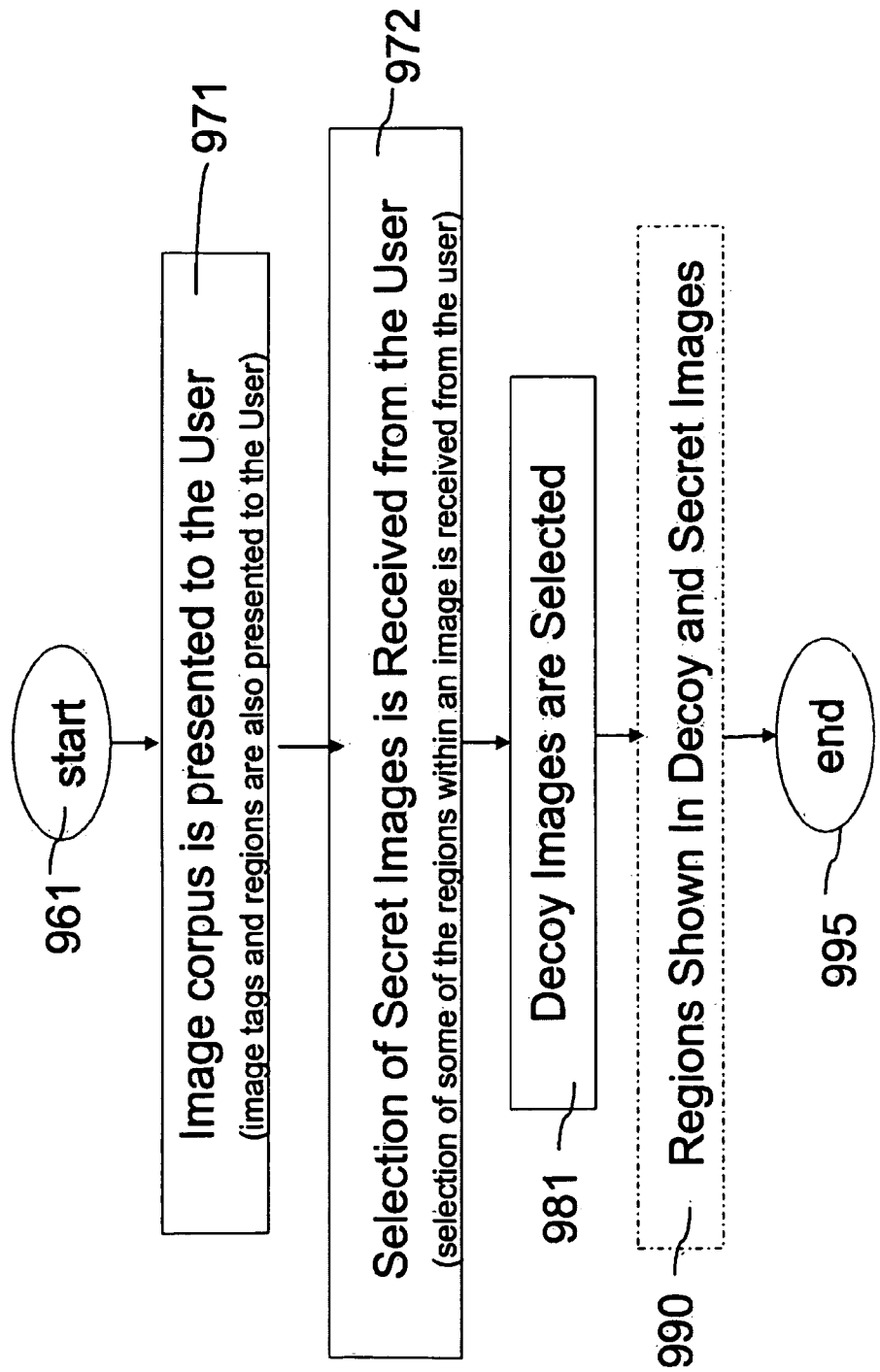

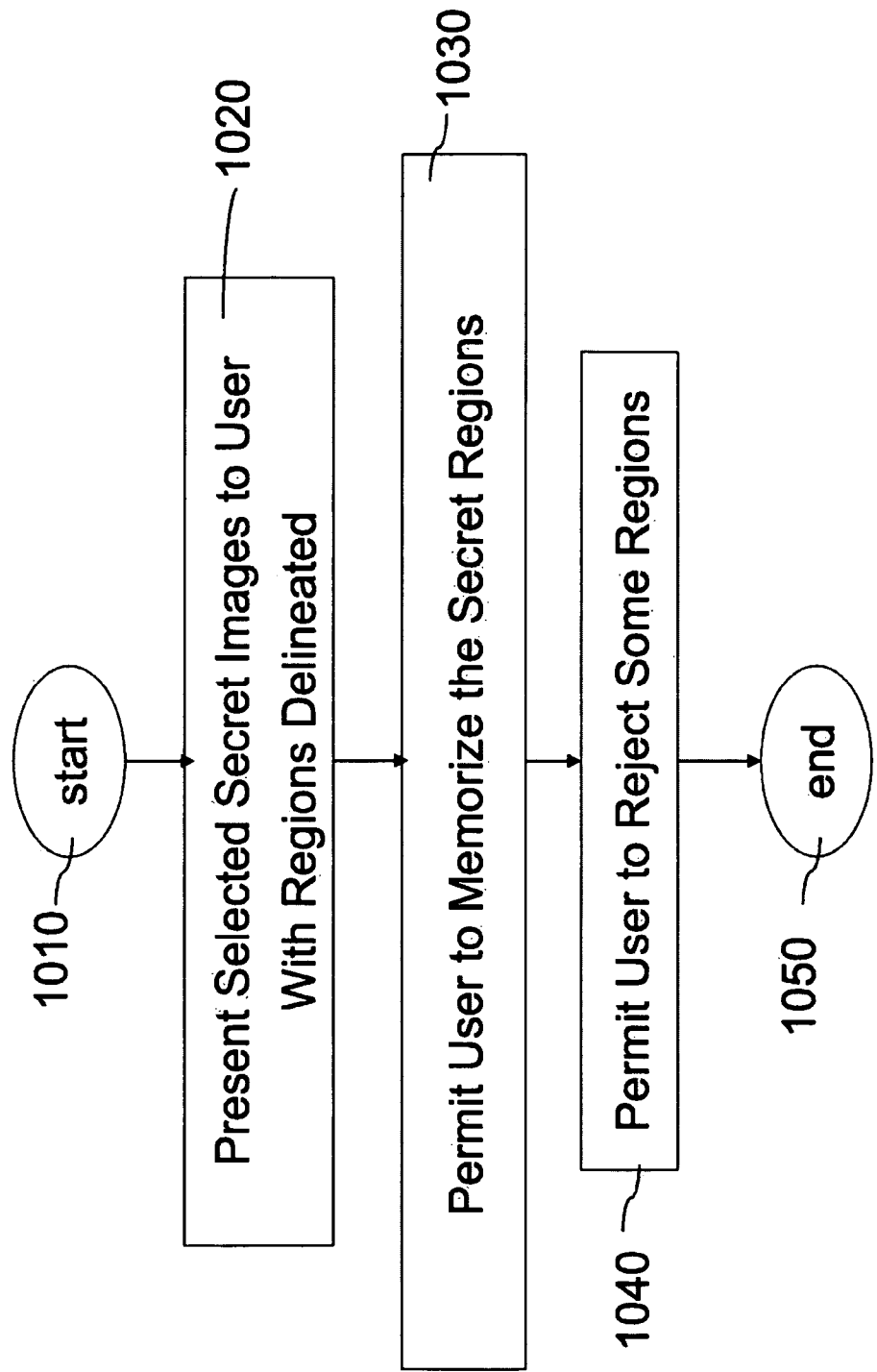

Figure 12B
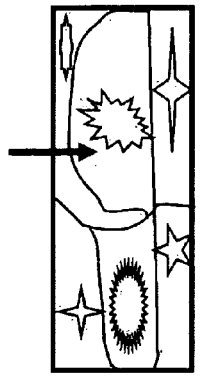 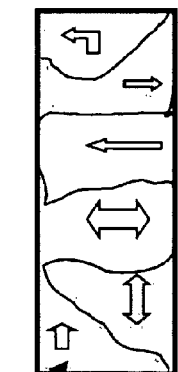 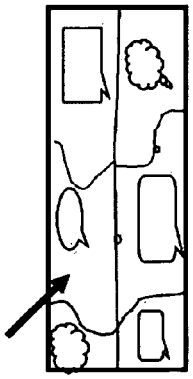 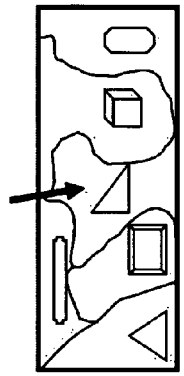
1221  1222  1223  1224
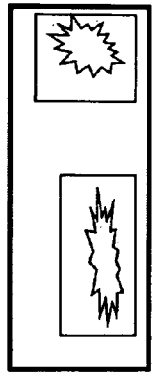 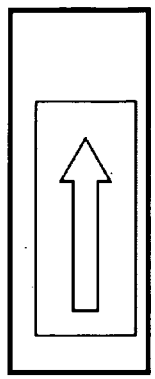 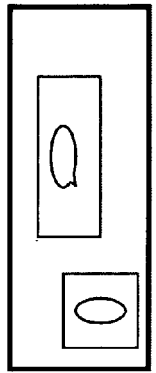 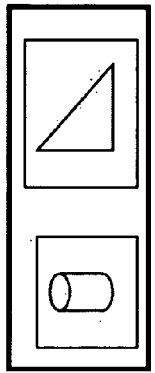
1231  1232  1233  1234

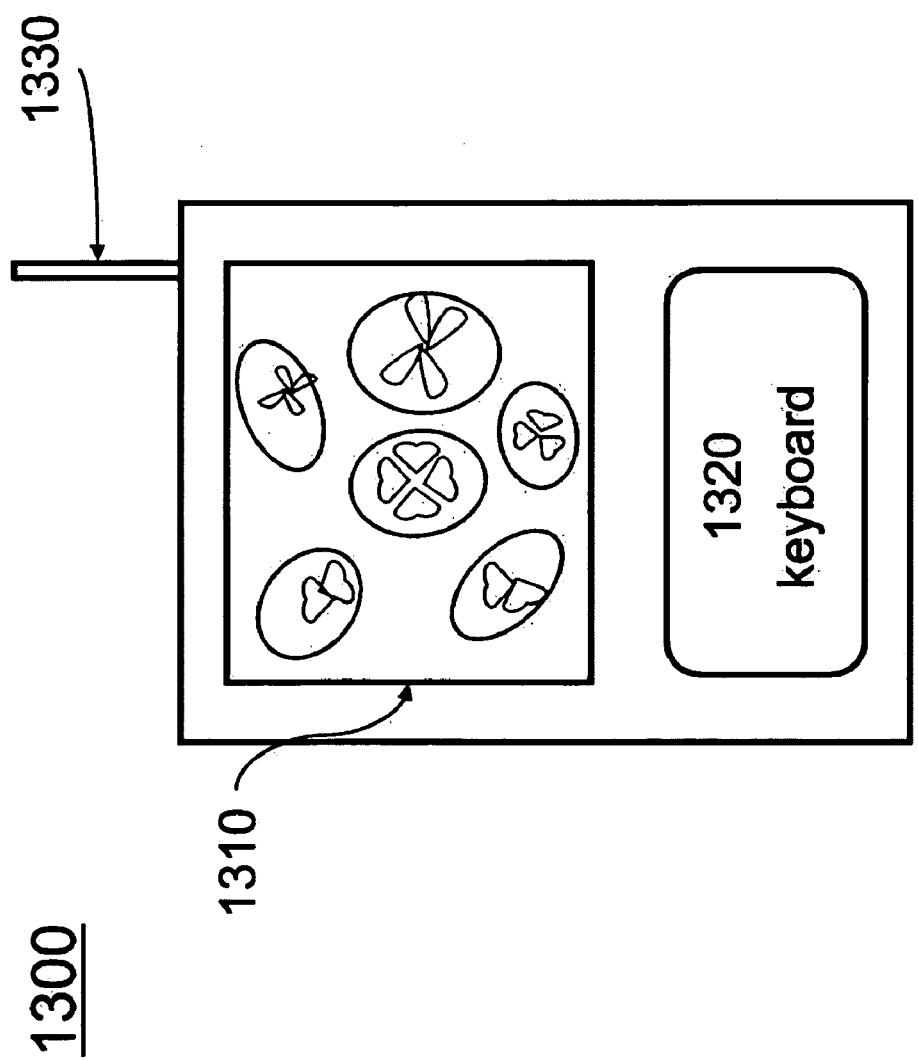

GRAPHICAL SYSTEM AND METHOD FOR USER AUTHENTICATION

BACKGROUND

1. Field of the Invention

The present invention generally relates to the field of access control and authentication and in particular to graphical methods of user authentication.

2. Background of the Invention

Today, access to many office buildings, bank accounts, email accounts, or other physical and virtual locations requires the use of a password. Passwords, or personal identification number (PIN) codes, are the predominant form of user authentication used on almost all computing platforms including: personal computers, cell phones, personal digital assistants (PDAs), copiers and printers, and cash dispensers such as automated teller machines (ATMs). Passwords are also used to access online accounts.

A strong password, that is more difficult to break and provides greater security, consists of a sequence of symbols randomly and uniformly chosen from a large alphabet. Unfortunately, strong passwords are hard to remember. This leads to a situation where users choose weak passwords or write their passwords down because they cannot reliably commit strong passwords to memory.

Another common problem encountered for the user is that there are too many alphanumeric accounts and passwords to remember. The same person using electronic means to gain access to her office and her various accounts may have to remember a large number of passwords. When the number of accounts a user possesses grows, it becomes a challenge to memorize all the passwords associated with these accounts. The user may resort to using the same password for different purposes which compromises the security of her accounts.

Difficulty of using alphanumeric passwords has prompted considerable research on alternative ways to authenticate users. One such alternative is the use of graphical passwords based on the observation that humans have excellent image recognition capabilities.

In a typical graphical user authentication system, the user chooses one or more secret images during a setup phase. During the challenge phase, the user is presented with a grid of images as a challenge set. The challenge set consists of decoy images and one of the images that the user has chosen as her secret image during the prior setup phase. The user answers the challenge by identifying the secret image to the system. Multiple rounds of challenges are performed until the likelihood of a random unauthorized login is sufficiently small. In each challenge round, a different secret image is used, which means that the user must memorize as many images as there are rounds. For example, if 10 images are presented per challenge round, then the probability of randomly guessing the correct image in each round is approximately one tenth. Psychological factors impact the probability and therefore the probability of each guess may not be exactly 1/10. If four challenge rounds are used to grant access, the probability of a random and unauthorized access is reduced to approximately one over ten thousand or the fourth power of one tenth. Therefore, four rounds have a random guessing probability that approximately equals the probability of guessing a 4-digit PIN number as it is used to log into an ATM. The security can be improved by presenting more images per round. However, when handheld and mobile devices are being used, it is difficult to present a large number of images simultaneously on the display of the mobile device because the portability of the device also mandates the display to be small.

FIG. 1A illustrates a first conventional fixed grid graphical user authentication system. FIG. 1B shows a schematic caricature version of the first conventional fixed grid graphical user authentication system.

The system shown in FIG. 1B presents a fixed grid arrangement of images to the user. All but one of the images shown are decoy images 110. One of the images is a secret image 120 that has been previously selected by the user. To be authenticated, the user must identify the correct secret images in several rounds of trials. The decoy 110 and secret 120 images are not pictures of faces.

Most conventional fixed grid systems use a 3×3 grid to correspond to the keypad of the telephone. Further, most conventional systems use images that belong to the user himself. The whole image is used, so each secret image corresponds to a total of one secret.

An exemplary implementation of this first conventional method is described in "Déjà Vu: A User Study Using Images for Authentication," Rachna Dhamija, Adrian Perrig, Proceedings of the 9th USENIX Security Symposium, 2000.

FIG. 2A shows a second conventional fixed grid graphical user authentication system. FIG. 2B shows a schematic caricature version of the second conventional fixed grid graphical user authentication system.

The system shown in FIG. 2B also presents a fixed grid arrangement of images to the user. In this system too, all but one of the images shown are decoy images 210 and one of the images is a secret image 220 that has been previously selected by the user. Here too, the user must identify the correct secret image in several rounds of trials. In the second system, however, the decoy 210 and secret 220 images are pictures of human faces. Recognition of human faces is easier for a user.

This second conventional method is described in "Distributed Client/Server Computer Network," A. E. Ryan, U.S. Pat. No. 6,981,016, issued Dec. 27, 2005, and in "Personal identification devices and access control systems," John H. E. Davies, U.S. Pat. No. 5,608,387, issued Mar. 14, 1997.

Both systems use whole images as their decoy and secret images and are prone to attacks by shoulder surfing, social engineering, image analysis and a variety of other types of attacks. Shoulder surfing occurs when an attacker looks over a user's shoulder and is able to view the some portion of the image. By viewing only the upper portion, or any other border portion of the image, the attacker is able to identify the whole image in a grid.

The conventional fixed grid systems require extensive training of the user. This is due to the fact that the user may need to memorize a greater number of pictures.

The larger the number of images shown in a grid, the lower the probability of a random guess. So, to increase security, it is desirable to fit a large number of images in the grid. The fact that the images may become unrecognizable if reduced to be smaller than a certain size, makes the conventional fixed grid arrangements unsuitable for handheld and mobile devices with smaller screens.

Therefore, there is a need for graphical authentication systems and methods that provide improved security. There is a further need for graphical authentication systems and methods that may be deployed on handheld mobile devices with small screens.

SUMMARY OF THE INVENTION

Aspects of the present invention address the issues associated with user authentication in computing devices and accounts using graphical authentication methods.

Aspects of the present invention describe a mechanism that improves the usability and security of graphical authentication in several aspects. The mechanism automates and simplifies the steps of selecting and preparing images suitable as secret images and decoy images. The mechanism introduces the use of multiple regions per image instead of the whole image, which improves the security of graphical authentication. The security is further improved by a method that is used for selection of regions from an image, according to aspects of the present invention. The mechanism arranges and renders images in a compact fashion such that a larger number of images may fit onto a small display without compromising the user's ability to recognize image contents. A larger number of images corresponds to a lower probability of a random and unauthorized guess and increases security of the system.

Aspects of the present invention use partial images, or regions within images, as secrets and as decoys. Therefore, regions of an image are used during the challenge and response phase. This increases the security of the mechanism against shoulder surfing attacks. A mix of whole images, partial images and regions within the images may also be used as secrets and as decoys.

In various aspects of the present invention the regions are detected based on image analysis and by taking neighbor and similarity relationships into consideration. The region selection algorithms and scheme prevent attackers from easily associating regions of an image together and thus preventing shoulder surfing attacks. When one portion of the image is compromised, other portions may still remain unknown to the attacker and may not be easily deduced or guessed from the compromised portion.

The regions are capable of being extracted and scored automatically, or may be selected by a user. In various aspects of the present invention the secret and decoy images that form a corpus of images go through an image homogenization process where by filtering, selection, and other methods, the images within the corpus are homogenized such that the possibility of guessing based on group similarity is reduced.

Aspects of the present invention further provide a mechanism that uses the available display more efficiently for graphical user authentication.

In one aspect of the present invention, the arrangement of regions is determined not by random choice alone, but according to geometric properties. More recognizable image components can be fit onto the screen, such that more security relevant information is available on-screen. In addition, collage arrangement adds aesthetic aspects to the arrangement and display of the images, which makes the user experience more pleasant.

In various aspects of the present invention the collage or interface may be rendered not according to a random choice but based on pre-selected and pre-determined properties. For example, a collage may be rendered with a 4th July flag theme, with a Halloween Jack-O-Lantern theme, or with a Thanksgiving turkey theme.

In various aspects of the present invention the regions of the collage are rendered using a bubble or elliptical interface. In these aspects, the regions are bounded by the screen but each region can be dragged and then let go. As a result, the collage is presented with a different look and feel. Changing the look and feel of the collage provides an improved way of interacting with the authentication interface especially for touch screen devices.

In various aspects of the present invention the presentation may be dynamically adjusted to display geometry and a collage can be rendered and formatted for different devices and displays especially for small screen devices.

Aspects of the present invention are capable of using several regions of the same image during different passes of the challenge and response phase. Therefore, by remembering one secret image, a user has access to several secrets that may be used in several rounds or passes of a challenge and response phase.

An exemplary authentication using four rounds or passes of challenges, according to aspects of the present invention, is generally more secure than a 4-digit PIN due to multiple regions and compact nature of the collage. Further, there is always the capability to compact more decoy images into one single collage to improve security.

Aspects of the present invention provide, a method of forming a collage as a computerized graphical user authentication tool. The method includes constructing an image corpus, receiving a selection of a first image as secret image from the image corpus, retrieving images other than the secret image as decoy images from the image corpus, selecting one or more regions from the secret image as secrets, and one or more regions from the decoy images as decoys, and forming a collage including a first number of secrets and a second number of decoys. The selecting of one or more regions may include detecting regions from the secret image, detecting regions from the decoy image, selecting one or more regions from the secret image as secrets, selecting one or more regions from each decoy images as decoys, scoring each of the secrets according to information of the secret and relationship of the secret to other secrets in the secret image, and selecting one or more lowest scored secrets.

Aspects of the present invention provide a method of graphical user authentication. The method includes receiving a selection of a first set of images as secret images from a user, retrieving a set of images other than the first set of images as decoy images, selecting one or more regions within each secret image as secrets, and one or more regions within each decoy image as decoys, forming a collage including a first number of secrets and a second number of decoys, presenting a challenge to the user by requiring identification of a third number of secrets in the collage, and authenticating the user if the user correctly identify a fourth number of secrets within a fifth number of challenges.

Aspects of the present invention provide a system for graphical user authentication. The system includes a storage medium storing a corpus of images, a display for displaying images in the corpus of images to a user, an input interface for receiving a selection of images as secret images from the user, and a processor for executing programs. The programs executed by the processor are for retrieving images other than the secret images from the storage medium as decoy images, selecting one or more regions within each secret image as secrets and one or more regions within each decoy image as decoys, forming a collage including a first number of secrets and a second number of decoys, presenting a challenge to the user on the display by requiring identification of a third number of secrets within the collage, and authenticating the user if the user correctly identify a fourth number of secrets within a fifth number of challenges through the input interface.

BRIEF DESCRIPTION OF THE DRAWINGS

This application includes photographic images. An approximate and schematic caricature representation of each of the photographic images is included with each figure that includes photographs. The drawing including a caricature version does not include all of the features of the corresponding drawing including the photograph and is being presented for ease of description.

FIG. 1B shows a schematic caricature version of the first conventional fixed grid graphical user authentication system.

FIG. 3A shows a first exemplary collage according to aspects of the present invention.

FIG. 3D shows a schematic caricature version of the second exemplary collage of FIG. 3C according to aspects of the present invention.

FIG. 4A shows an example of impact of shoulder surfing attack on separate regions of an image that includes regions, according to aspects of the present invention.

FIG. 4B shows a schematic caricature version of the impact of shoulder surfing attack on separate regions of the image that includes regions, according to aspects of the present invention.

FIG. 5 shows a comparison between the cost of memorization to a user associated with the graphical systems existing in the literature and the graphical system according to aspects of the present invention.

FIG. 7 shows one exemplary method of image preprocessing and preparation.

FIG. 9B shows a flow chart of an enrollment process according to aspects of the present invention.

FIG. 9C shows a flow chart of an enrollment process according to aspects of the present invention.

FIG. 10A shows a flow chart of a training method according to one aspect of the present invention.

FIG. 12B shows another exemplary challenge and response phase including four rounds of passes.

FIG. 13 illustrates a first exemplary embodiment of a computer platform upon which the inventive system may be implemented.

DETAILED DESCRIPTION

In the following detailed description, reference will be made to the accompanying drawings, in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the present invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the present invention as described may be implemented in the form of a software running on a general purpose computer, in the form of a specialized hardware, or combination of software and hardware.

Aspects of the present invention include a graphical authentication mechanism. Aspects of the present invention select, arrange and render regions of images in a compact collage, such that usability and security are optimized. Several rounds or passes of image collages are presented to a user for authentication during a challenge phase. Each image collage includes regions from the secret image and decoy images. In order to be authenticated, the user has to select the secret image from among the decoy images in the collage. Further, the user has to make the correct selection for a number of rounds.

Aspects of the present invention are not constrained to the use of an entire image as a whole and may instead use regions within the image. This is in contrast with what is being used in the art today. Because each region carries a different piece of information or secret, the security of the system is improved if regions of an image are utilized instead of the whole image. Furthermore, aspects of the present invention select regions in the image that are more secure than the other regions of the same image. Aspects of the present invention next arrange and render the secret regions, selected from within the secret images, and a number of decoy images into collages. Each collage may be a compact arrangement of one or more secrets together with a number of decoys. Computing devices vary in display sizes and interfaces, a compact representation makes authentication across different device platforms feasible.

Figure 1A:
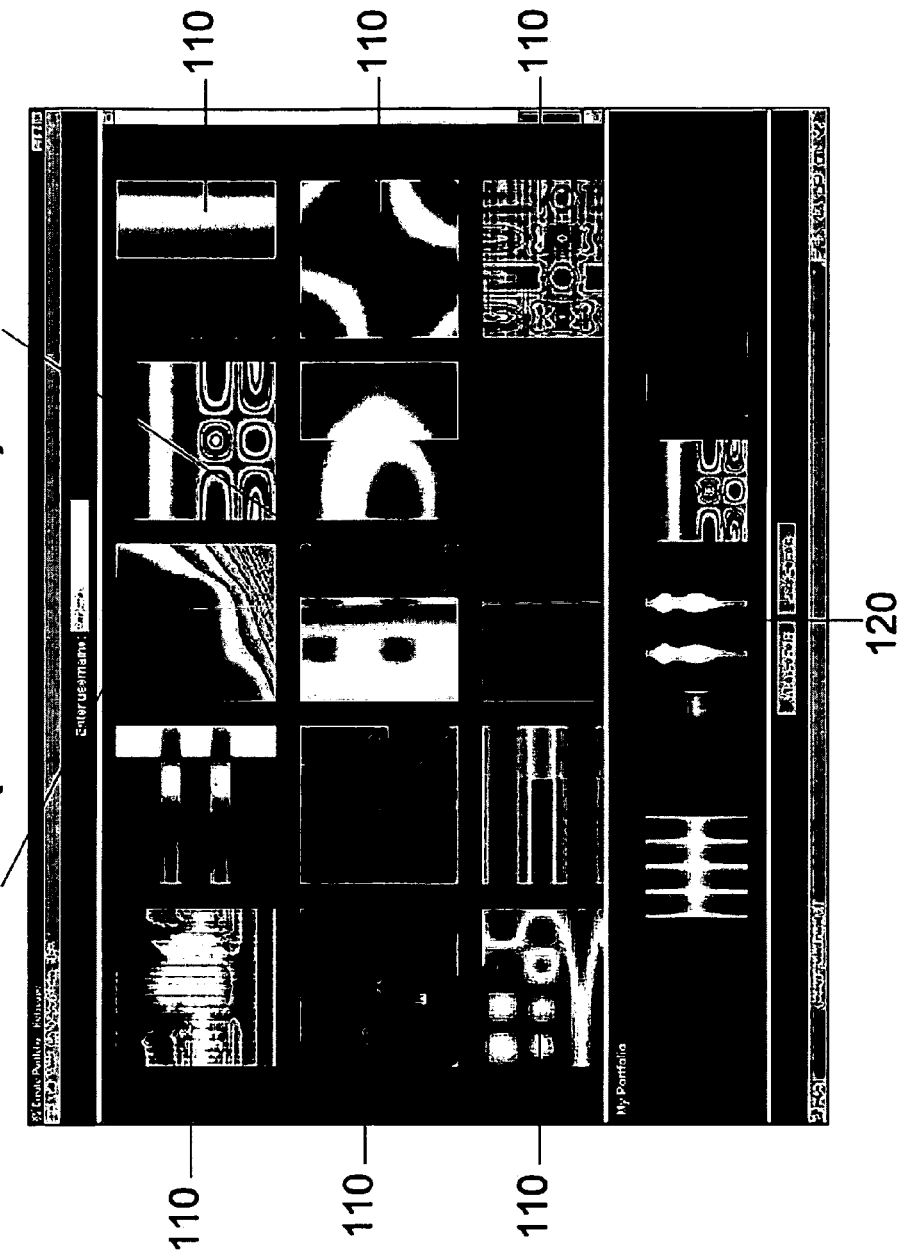
FIG. 1A shows a first conventional fixed grid graphical user authentication system.
Figure 2A:
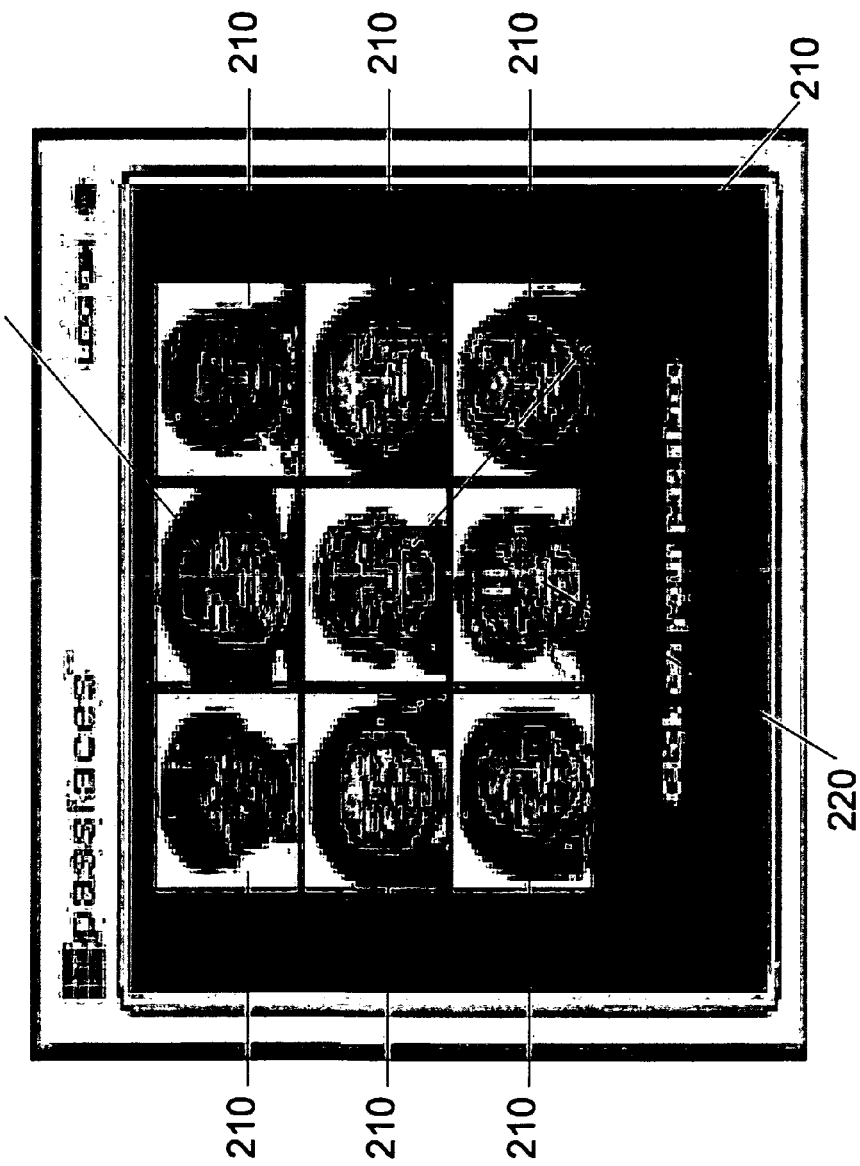
FIG. 2A shows a second conventional fixed grid graphical user authentication system.
Figure 2B:
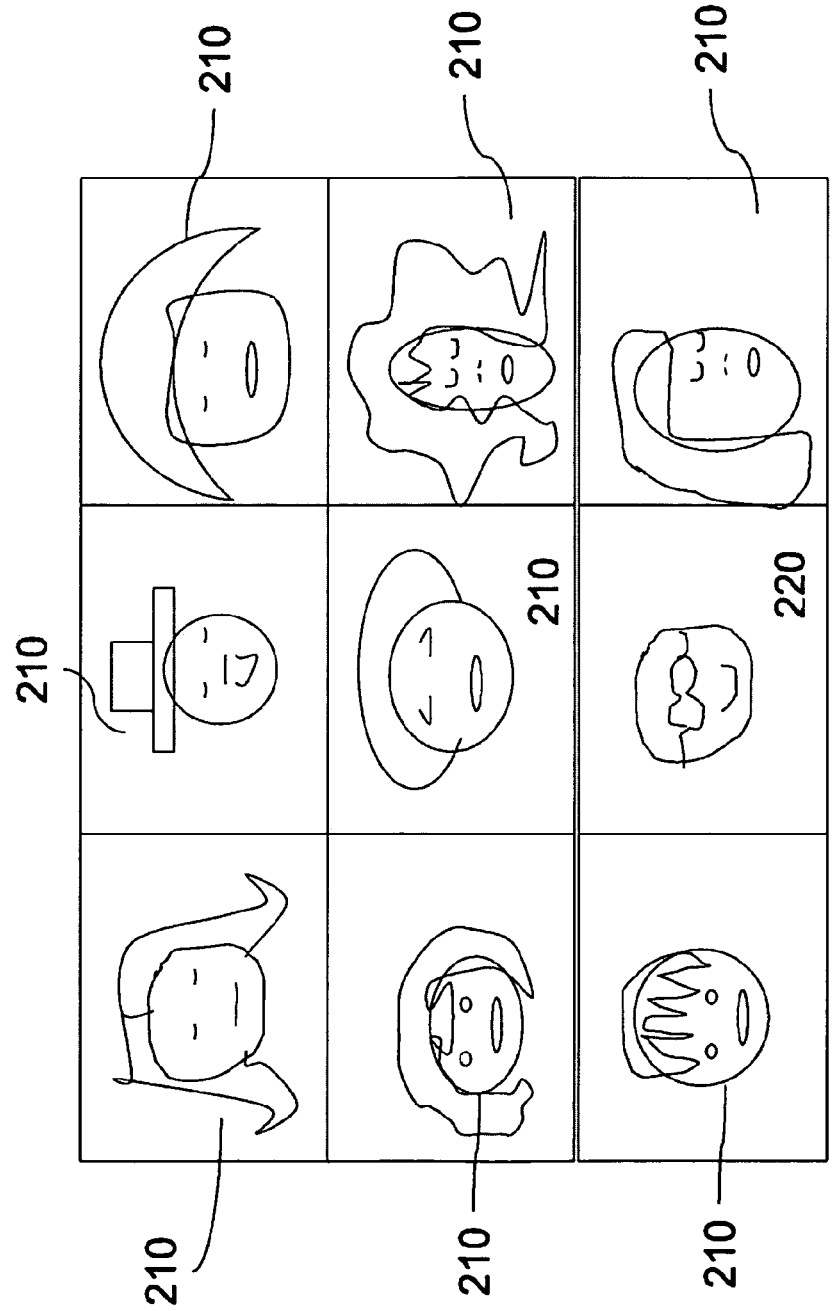
FIG. 2B shows a schematic caricature version of the second conventional fixed grid graphical user authentication system.
Figure 3B:
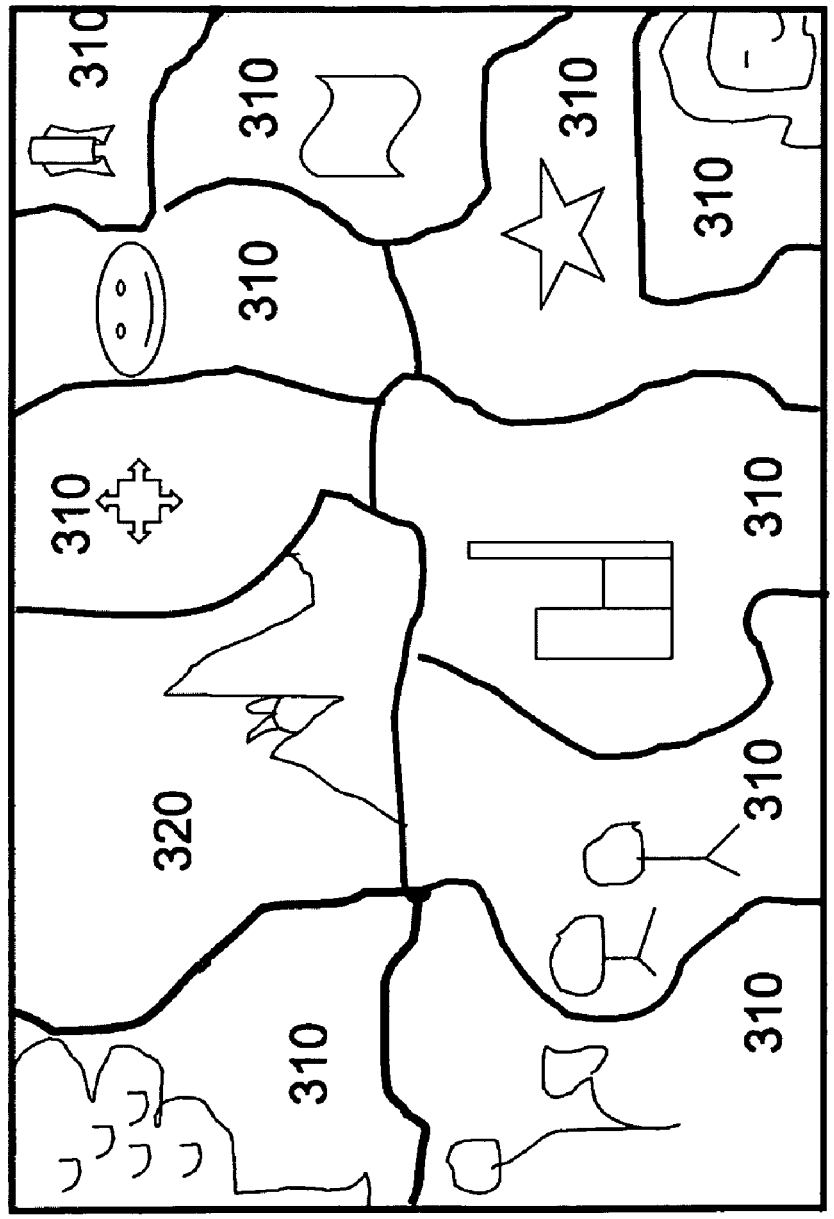
FIG. 3B shows a schematic caricature version of the first exemplary collage of FIG. 3A according to aspects of the present invention.
Figure 3C:
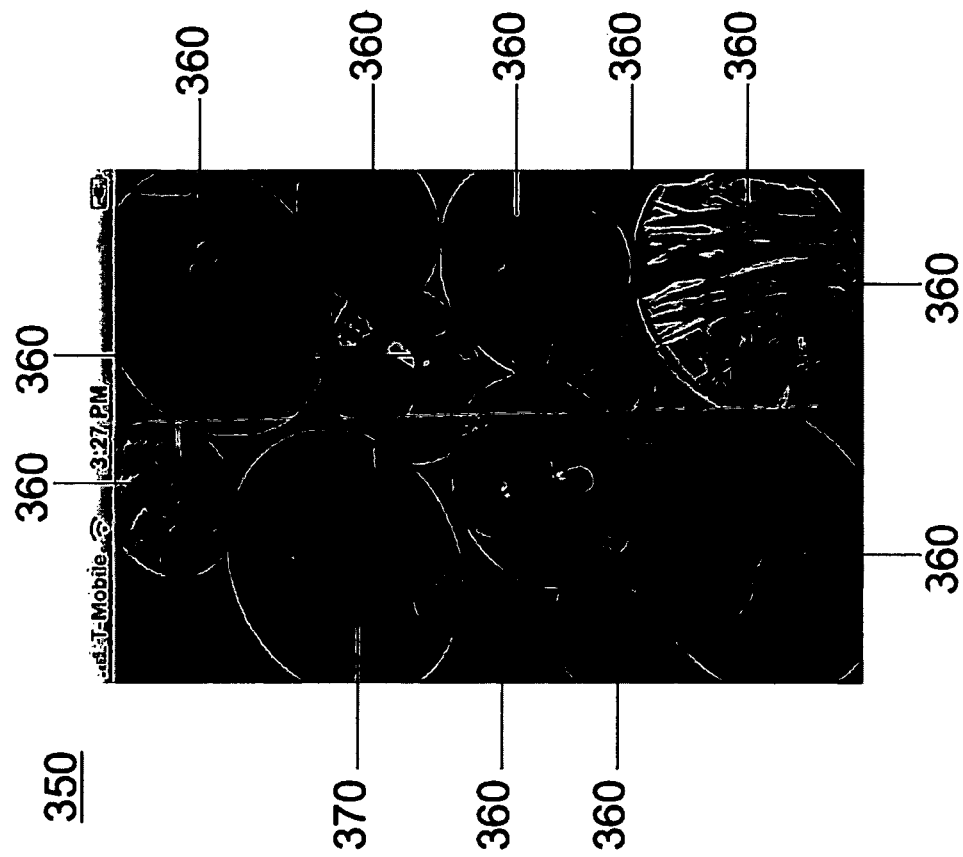
FIG. 3C shows a second exemplary collage according to aspects of the present invention.

FIG. 3A shows a first exemplary collage according to aspects of the present invention. FIG. 3B shows a schematic caricature version of the exemplary collage of FIG. 3A according to aspects of the present invention. FIG. 3C shows a second exemplary collage, where each region is represented by a predefined shape such as an ellipse. FIG. 3D shows a schematic caricature version of the exemplary collage of FIG. 3C according to aspects of the present invention The collages shown in FIG. 3A, FIG. 3B, FIG. 3C and FIG. 3D do not include a fixed grid. Rather, a collage of images each capable of having a different size and non-rectangular borders may be presented. Boundaries shown in FIG. 3A and FIG. 3B are irregularly shaped. Other rendering scenarios including various regularly shaped boundaries such as grid, box, circle, ellipse and the like may also be used as shown in FIG. 3C and FIG. 3D. Also, the portions of the collage can be tiled together, overlapping together, or non-overlapped. The images in the collage include human faces, other images, and synthetic graphics. The images in the collage may include complete and whole images or only portions or regions of a whole image.

Unlike the conventional methods shown in FIG. 1A, FIG. 1B, FIG. 2A and FIG. 2B that use the whole secret image, aspects of the present invention arrange and render a region 320 (or regions) of the secret image into a collage 300 including decoys 310 as well as the secret 320 as shown in FIG. 3B. Such measure improves the security as well as the compactness of the system. By fitting the region 320 of the secret image into the collage, shoulder-surfing attacks can be prevented. Similarly, secret 370 is embedded in the collage 350 together with decoys 360 as shown in FIG. 3D. Considering an image as including multiple regions, one single image carries multiple pieces of information, or secrets. Seeing one region of the secret image does not guarantee the attacker getting all the secrets of that secret image. At the same time, while the secret image includes multiple regions thus multiple secrets, the cost of remembering this secret image to the user is still one.

FIG. 4A shows an example of impact of shoulder surfing attack on separate regions of an image that includes regions, according to aspects of the present invention. The attacker may have a sneak peek of some part of the image marked as region "a," while other part of the image marked as region "b" remains hidden from him.

FIG. 4B shows a schematic caricature version of FIG. 4A.

Image 400 is processed with region detection algorithms and a first region 410 and a second region 420 are detected. The first and second regions 410, 420 include different features and are not neighboring each other. The first region 410 includes a farmhouse. The second region 420 includes sheep that are grazing near the farmhouse. If a shoulder surfing attacker is able to peek over the shoulder of the user, the attacker may be able to see the portion of the image 400 that is above a line 430 and includes the first region 410. However, it is unlikely that she can guess the existence and features of the second portion 420 from the features of the first region 410.

FIG. 5 shows a comparison between the cost of memorization to a user associated with the graphical systems existing in the literature and the graphical system according to aspects of the present invention.

FIG. 5 shows image 510 and shows that the cost of remembering the image 510 to the user is one image remembered. If the whole image is used as a secret 520, then the user gains access to one secret 520 for the cost of remembering one image 510. This is the cost and benefit to the user in the conventional systems that use the whole image as the secret. If a number n, for example n=3, regions of the image 510 are used as secrets 530 obtained from the image 510, then for the cost of memorizing and remembering the same one image, the user has access to three separate secrets 530. If a PIN has 3 digits or 3 selections, the user has to remember 3 complete images as her password in the conventional full image systems of prior art. However, 3 regions of the same one image maybe used as the 3 PIN selections in a system according to the aspects of the present invention.

Figure 6:
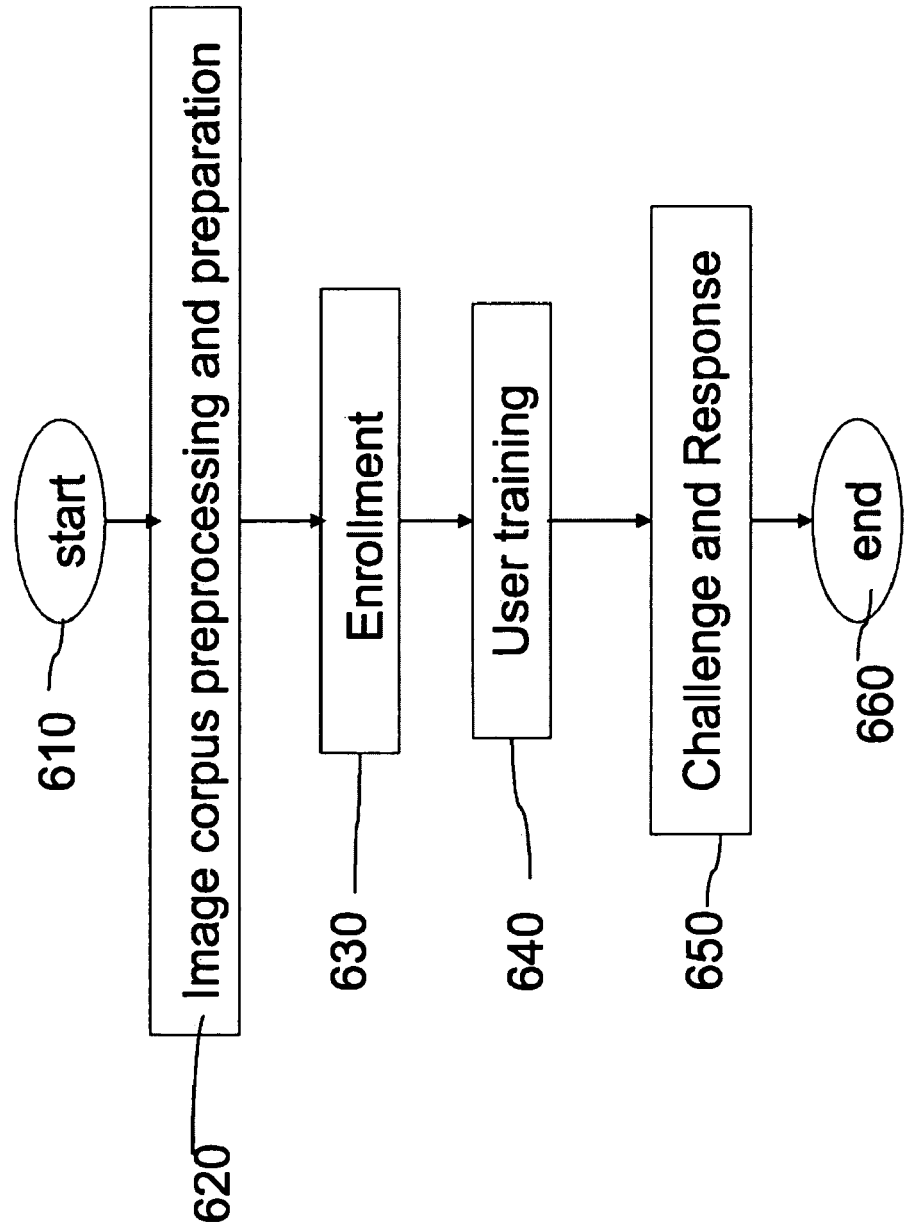
FIG. 6 shows an exemplary method of preparing the collage according to aspects of the present invention.

FIG. 6 shows an exemplary method of preparing the collage according to aspects of the present invention.

The method includes an image corpus preparation phase, an enrollment phase, a training phase and a challenge and response phase.

The method begins at 610. A corpus of images is available from which secret and decoy images are to be chosen. This corpus could be images taken and stored by a user on her mobile phone. The image corpus could also consist of prearranged sets of stock photography, celebrity images or other sets of images.

At 620, the image corpus is preprocessed and prepared. During the preparation phase, the available image stock is analyzed and images are selected such that attacks during the challenge phase that are based on analysis and comparison of image sets are minimized. The preprocessing and preparation phase may also involve filtering and transformation of images such that the aforementioned security objectives are achieved with the given image corpus.

At 630, enrollment of the secret and decoy images is conducted. The preprocessed corpus of images is presented to the user. Secret images or secret regions within some of the images are selected by the user and provided to the system. The system selects the decoys based on the secret images selected by the user. In one aspect of the present invention, training collages including the secret regions may be presented to the user.

At 640, a user training phase is conducted. The user is presented with the images with the regions shown on each of the images. The user familiarizes herself with the regions. In one aspect of the present invention, the user may provide feedback by accepting some regions and rejecting others.

At 650, the challenge and response phase of the method is conducted. In this phase, rounds or passes of collages are composed and presented to the user as a challenge. The user has to identify the secret region from the collage as the response to the challenge.

At 660, the method ends.

FIG. 7 shows an exemplary method of image corpus preprocessing and preparation according to aspects of the present invention.

A corpus of images is prepared at 710. The images in the corpus may be any set of images or a combination of images from various sets of images. For example, images from various trips combined with images from various parties and wedding and combined with celebrity images.

The images in the corpus are then preprocessed at 720. The preprocessing includes selecting the images to be used from the corpus, discarding skewed images, homogenizing the remaining images and clustering the homogenized images. During the preprocessing, the regions that are to be used for the authentication process are detected. The detected regions may also be scored according to certain scoring criteria.

Skewed images that are different from the other images by some criteria are thrown away. For example, images that may be guessed due to having a lower quality, having a different resolution, a different compression quality are discarded. Attack is more difficult if the secret and decoy images were produced by the same source.

Images are selected, from the corpus, that have similar encoding quality and color characteristics. If not, the images are homogenized to make their encoding quality and color characteristics uniform. Then, it becomes computationally more difficult to associate different regions of the same image with one another when presented together with regions selected from other images in the corpus.

The selected images can be tagged as appropriate to support dynamic grouping and clustering when needed.

Clustering of the images can also be performed if needed. During clustering, images are clustered together that include some common feature. For example, pictures of trees and natural scenery are clustered together and pictures of faces are clustered together. If the secret image includes faces, then decoys are selected from a cluster of decoys that also include faces.

Furthermore, each image is segmented meaning that regions within the image are detected. Various region detection algorithms that are known in the art may be used. Examples of region detection algorithms are those used for Stained Glass collages developed, J-value segmentation (JSEG) or by graph decomposition.

Stained Glass is a general framework of automatically generating collages from video and is described in various publications including U.S. Patent Application Publication No. 20050220348 titled "Extracting video regions of interest," to inventors P. Chiu, A. Girgensohn, and Q. Liu; U.S. Patent Application Publication No. 20060062455 titled "Determining regions of interest in synthetic photographs and images," to inventors P. Chiu, Q. Liu, and A. Girgensohn; U.S. Patent Application Publication No. 20060062456 title "Determining regions of interest in synthetic images," to inventors P. Chiu, Q. Liu, and A. Girgensohn; U.S. Patent Application Publication No. 20050220345 titled "Generating a highly condensed visual summary," to inventors P. Chiu, A. Girgensohn, and Q. Liu; "Stained Glass Photo Collages," P. Chiu and A. Girgensohn, UIST '04; and "Stained-Glass Visualization for highly condensed video summaries," P. Chiu, A. Girgensohn, and Q. Liu, ICME '04. The algorithm used in Stained Glass detects the regions of an image based on color and texture energy of each region. Texture is an indicator of repeating patterns in the image. JSEG is described in "Unsupervised segmentation of color-texture regions in images and video," IEEE Transactions on Pattern Analysis and Machine Intelligence, Yining Deng and B. S. Manjunath, August 2001, vision.ece.ucsb.edu/segmentation/jseg/. Graph decomposition is described in "Spectral Segmentation with Multiscale Graph Decomposition," Timothee Cour, Florence Benezit, Jianbo Shi, IEEE International Conference on Computer Vision and Pattern Recognition (CVPR), 2005. Other regions computing algorithms that are more specific may also be used. For example, face detection algorithms can be used alone or together with other region detection algorithms. An example of irregular shape rendering can be found in the U.S. Patent Application No. 11/525,589, titled " An Annealing Algorithm for Non-Rectangular Shaped Stained Glass Collages," to inventors K. Murai, P. Chiu, W. Polak, A. Girgensohn and Q. Liu.

The detected regions of an image are scored according to a proposed formulation that establishes the correlation among the regions.

It is desirable to minimize the correlation among the regions that are detected or selected in one image such that one region provides the least information regarding another region. Then, if a hacker has seen one portion of the image, she cannot guess the other portions, that may include the secret regions, from the portion that she has seen. For example, neighboring portions give information out about each other and generally two neighbors are not both detected or selected as regions of an image to be used as secrets. Similar portions of an image that may not be necessarily neighboring, such as two Joshua trees in two corners of the image, also provide information about each other and it is not desirable to use both areas as secret regions.

Region detection and scoring procedures can be done during the preparation phase or during a later enrollment phase. These operations only need to be completed before collages are presented to the user.

Region detection and scoring may be done by algorithms that run on a machine or by a person viewing the images and outlining regions. A current practical approach may be to automate the region detection and scoring by algorithms that run on a machine or machines for large image corpus, the results can be further refined by human.

Figure 8A:
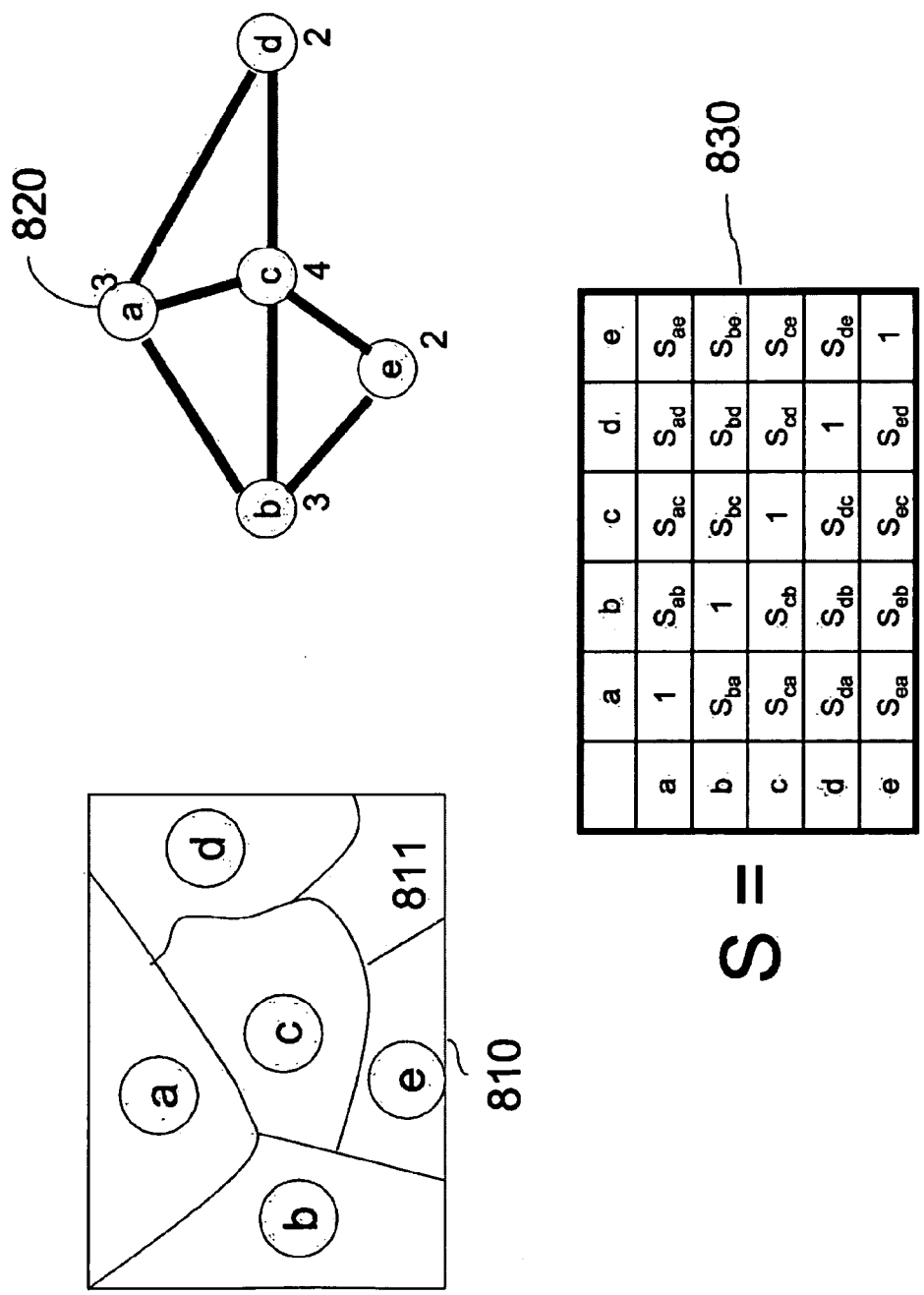
FIG. 8A shows an exemplary algorithm for region scoring according to aspects of the present invention.

FIG. 8A shows an exemplary algorithm for region scoring according to aspects of the present invention.

After the regions are detected within an image by a region detection algorithm that is currently known or later developed, the detected regions are scored by a region scoring algorithm according to aspects of the present invention. Regions that are least related to other regions of the image are most effective as secrets. This is because, these secrets are least likely to be guessed or calculated if the other regions of the image are compromised. Thus selecting such regions as secrets reduces the impact of shoulder surfing attacks.

FIG. 8A shows an exemplary image 810 that has been analyzed by a region detection algorithm, such as JSEG or Stained Glass, and five regions of a, b, c, d, and e have been detected. A portion 811 of the image 810 is not detected as a region due to its particular characteristics that make it undesirable as a region. The regions a, b, c, d, and e, on the other hand, have passed the region detection procedure. In the example illustrated in this figure, regions a, b, c, d, and, e have 3, 3, 4, 2, and 2 neighboring regions, respectively, as shown in the depiction 820.

A similarity matrix 830 is also shown and designated as S. The similarity matrix 830 is used to characterize the similarities among regions. The rows of the exemplary similarity matrix correspond to the five detected regions in a certain order and the columns of the matrix correspond to the same five detected regions in the same order. The number i of a region $r_i$ corresponds to its place along the rows and columns of the similarity matrix S. For example, the similarity values corresponding to region a or $r_1$ are located along row 1 and column 1 of the similarity matrix S. Similarly, the similarity values corresponding to region b or $r_2$ are located along row 2 and column 2 of the similarity matrix S.

Each element ij of the similarity matrix S, provides the similarity between the region corresponding to row i and column j, where i=a through e and j=a through e. The elements ii of the similarity matrix S along the diagonal are all equal to one because each region is completely similar to itself. As another example, the value $S_{bc}$ indicates the similarity between region b and region c of the image 810 and is located as the element in row 2, i=2, and column 3, j=3, of the similarity matrix S.

The score $r_i$ of region i is formulated as follows: $r_i=f(\theta_i, \sigma_i)$, where the function f(.) can take different forms that take into account the information from the neighborhood relationship as well as the similarity of a region i to its neighboring regions. One example of the function f(.) is shown in the following equation (1) according to aspects of the present invention.

$$r_i = w_1\theta_i + w_2\sigma_i \qquad (1)$$

In equation (1), $\theta_i$ is the number of neighboring regions of the region i, and region similarity measure $\sigma_i$ is a measure of how similar the region i is to other regions of the image. The scalar $w_1$ is a weight of using the neighborhood relationship, and $w_2$ is the weight factor for the use of the similarity relationship.

The region similarity measure as is determined from equation (2).

$$\sigma_i = \Sigma S_{ij} \text{ where the summation } \Sigma \text{ is taken over all j}$$
$$\text{where } j \neq i \qquad (2)$$

In other words, the region similarity measure ai for each region i is the sum of all elements of row i except the diagonal element that is always equal to 1.

The values of $\theta_i$ in FIG. 8A for regions a, b, c, d, and e are shown as 3, 3, 4, 2 and 2, respectively. The smaller the number of neighboring regions $\theta_i$, the fewer neighboring regions the region i has. Thus, selecting a region with a small $\theta_i$ is less likely to expose information about other regions of the image. However, a region might be similar to other regions even though those regions are not adjacent to it. An example of this situation occurs with two Joshua trees in two corners of an image. The two trees are similar while not adjacent.

The smaller the region similarity measure $\sigma_i$, the smaller the similarity of region i to other regions of the image.

Both of the above factors are given an appropriate weight through the weighting factors $w_1$ and $w_2$ and determine the score of a region $r_i$. The weighting factors indicate the desired emphasis. If similarity measure is to be emphasized more heavily, then a higher $w_2$ is assigned. On the other hand if neighborhood relationship is deemed more important, then a higher $w_1$ is assigned.

Once the score $r_i$ of all the regions i are determined, the regions are ranked in an ascending order (from smaller numbers to bigger numbers). The regions with the smallest values of $r_i$ are selected for later collage rendering. In this embodiment, a region with smaller value of $r_i$ is more desirable.

Another example of the function f(.) is shown in the following equation (3) according to aspects of the present invention.

$$r_i = -w_1 \psi_i + w_2 \sigma_i \qquad (3)$$

Figure 8B:
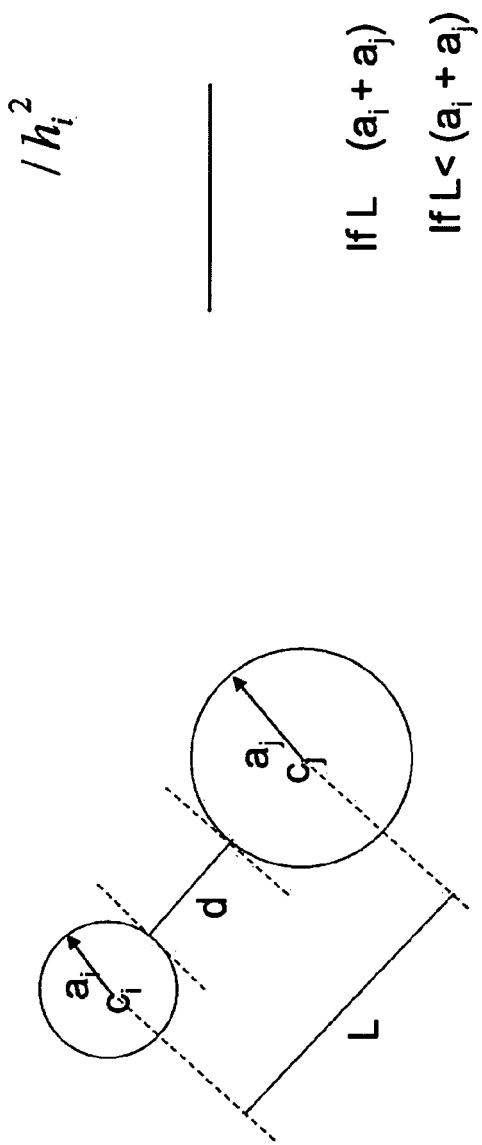
FIG. 8B shows another exemplary algorithm for neighbor relationship calculation according to aspects of the present invention.

FIG. 8B shows another exemplary algorithm for region scoring according to aspects of the present invention.

In FIG. 8B, the two ellipses centered at $c_i$ and $c_j$ are two of several possible elliptical regions detected by a region detection algorithm. The score of a region is determined according to $r_i = f(\psi_i, \sigma_i)$. In this equation, f(.) could take a number of different forms including $r_i = -w_1 \psi_i + w_2 \sigma_i$. In this alternative aspect of the present invention, $\psi_i = (\Sigma t_{ij})/h_i^2$, where $t_{ij}$ is related to the inter-region distance between region i and region j. Region i is shown to have a substantially circular shape with a radius $a_i$ and region j is shown to have a substantially circular shape with a radius $a_j$. Other shapes may be used and a radius is estimated for each region if it is not circular. Then, $t_{ij}$ is calculated from the relationship shown in FIG. 8B that is also repeated here $t_{ij} = \eta(d/[\min(a_i, a_j)]$, where $\eta = 1$ if $L \geq (a_i + a_j)$ and $\eta = -1$ if $L < (a_i + a_j)$, where L is the distance between the centers of the two circular regions i and j, d is a distance between the neighboring walls of the two regions and d is taken along a direction parallel to L. For the first condition of $L \geq (a_i + a_j)$, the two regions are either apart by a distance d or touch. For the second condition of $L < (a_i + a_j)$, the two regions are overlapping. A negative coefficient of $\eta = -1$ negates $t_{ij}$ and decreases the value parameter $\psi_i$.

Given that $w_1$ is a positive number, the first term of equation (3) is smaller for region i with a larger $\psi_i$. In this embodiment, a region with smaller value of $r_i$ is more desirable.

Again note that the region detection and scoring procedures need to occur only before arranging and rendering the regions in order to form the collage. As such, these steps can occur during the preparation or enrollment phases or at the challenge and response phase runtime.

Figure 9A:
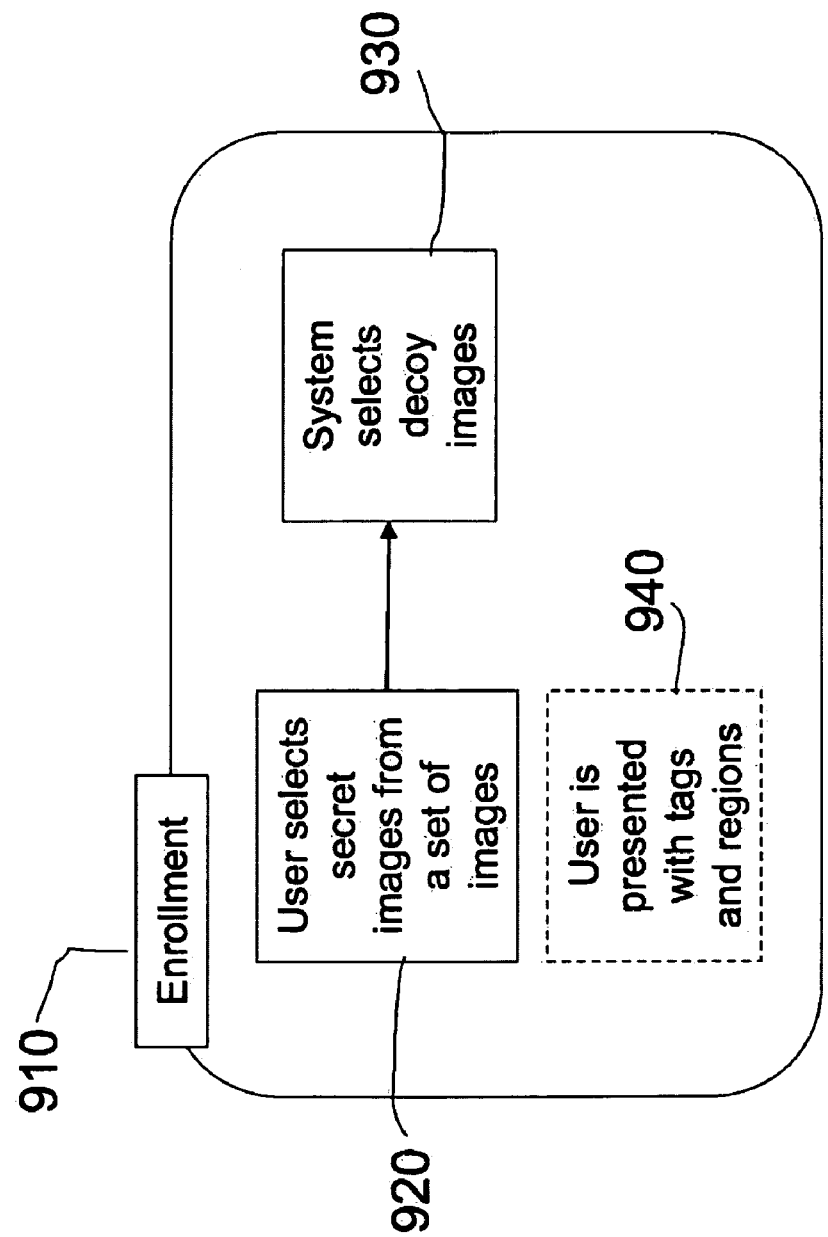
FIG. 9A shows a schematic diagram of enrollment according to aspects of the present invention.

FIG. 9A shows a schematic diagram of enrollment according to aspects of the present invention.

During the enrollment phase 910, the user is presented 920 with a set of images from the image corpus. The user selects some of the images from the corpus as her secret images. As mentioned above, the preprocessing and preparation stage assures that all the images have comparable image quality and characteristics. When the set of images are presented to the user for selection of the secret images, each image may be shown with keywords associated with it. In addition, each image may also be shown with its detected regions outlined on the image 940. Tags and regions can be computed in the preparation phase and embedded in the image as meta-data.

Regions can be detected and computed during the preparation and preprocessing phase or during the enrollment phase, or they can be directly provided by the user.

Once the secret images are selected by the user, decoy images could be selected by the system 930 from the same cluster or from different clusters. The tags of the images also allow the images to be re-grouped into different clusters dynamically.

FIG. 9B shows a flow chart of an enrollment process according to aspects of the present invention.

The method or process begins at 911. At 921, an image corpus is presented to the user by the system. At 922, the system receives a selection of the secret images from the user. At 931, the system selects the decoy images based on the secret images selected by the user. Regions can be detected already as stored as meta-data alongside with the image during the pre-processing stage as shown in FIG. 7 and in FIG. 9C. If region detection has not been done before the enrollment phase, then it may be performed at 940. At 950, the process ends.

During 921, each image may be presented to user with its detected regions delineated. Alternatively, the regions may be detected at 940 after the user selects her secret image.

During 922, the selection may be of whole images in which case the system is free to choose any regions of these images as secrets. Alternatively, the user may decide to select some of the displayed secret regions instead of selecting the whole image and leaving the selection of the secret regions to the system. In other words, the user may be permitted to reject some regions as unacceptable.

FIG. 9C shows a flow chart of an enrollment process according to aspects of the present invention.

The process of FIG. 9C is similar to FIG. 9B in steps 961, 971 and 972. Except, in FIG. 9C at step 990, regions that have been previously detected in decoy and secret images are shown to the user.

FIG. 10A shows a flow chart of a training method according to one aspect of the present invention.

The aforesaid training phase is not mandatory, and, therefore, the concept of the present invention is not limited by it in any way.

During one type of training phase, the regions in each secret image that were identified by the system or picked by the user are shown to user. The user is permitted to memorize them and reject those she has difficulty remembering.

The method begins at 1010. At 1020 the secret images including the secret regions are shown to the user. At 1030, the user is allowed time to memorize the secret regions. At 1040, the user is permitted to reject some of the regions within each secret image as undesirable, for example, because she finds it hard to remember or hard to distinguish. At 1050 the method ends.

Figure 10B:
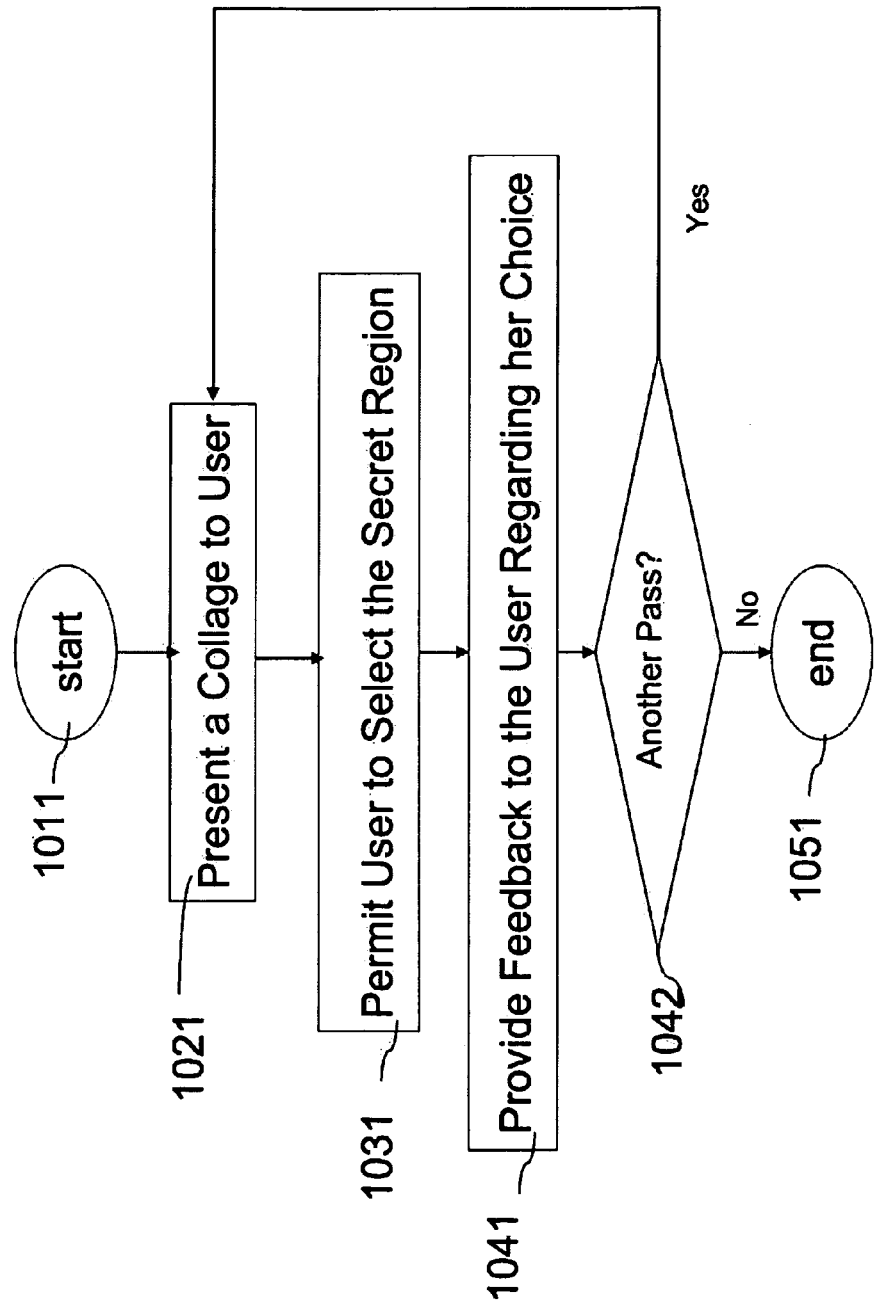
FIG. 10B shows a flow chart of a training method according to another aspect of the present invention.

FIG. 10B shows a flow chart of a training method according to another aspect of the present invention.

During another type of training phase, the user may perform a number of practice rounds of challenge and response to familiarize herself with the mechanism.

The method of FIG. 10B begins at 1011. At 1021, a collage including a secret region is presented to the user. At 1031, the user is permitted some time to locate the secret region and the selection is received at the system from the user. At 1041, the system provides feedback to the user regarding her choice. At 1042 the system either asks the user, or based on the result of training to that point decides on its own, whether further training is required. If further training is desired or required, another training collage is presented to the user in another pass. If no further training is required, the method ends at 1051.

Figure 11A:
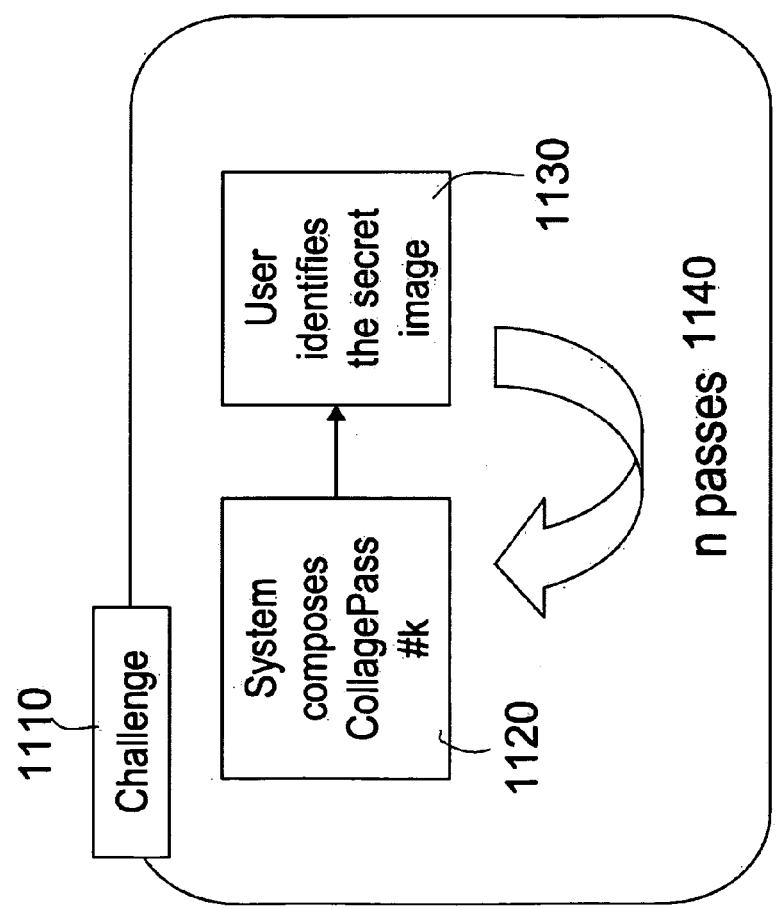
FIG. 11A shows a schematic diagram of a challenge and response phase according to aspects of the present invention.

FIG. 11A shows a schematic diagram of a challenge and response phase according to aspects of the present invention.

During the challenge and response phase, the user is presented with multiple rounds of collages, each of which consists of regions selected from images in the corpus. One region of a secret image is embedded in the collage among regions from the decoy images. The user authenticates herself by identifying the region that belongs to one of the secret images that she had previously chosen during an enrollment phase. Multiple challenge and response rounds are performed up to the number required to achieve the desired level of security against unauthorized access. For example, the user needs to point out the regions in all four rounds or passes in FIG. 12A in order to authenticate herself. The answer, which is the previously selected secret image, is shown on the right side of FIG. 12A with regions marked.

In FIG. 11A, during a challenge phase 1110, the system composes a collage 1120 and presents it to the user. The user identifies the secret image and provides her selection 1130 to the system. This presentation and selection process repeats n times during n passes 1140.

Figure 11B:
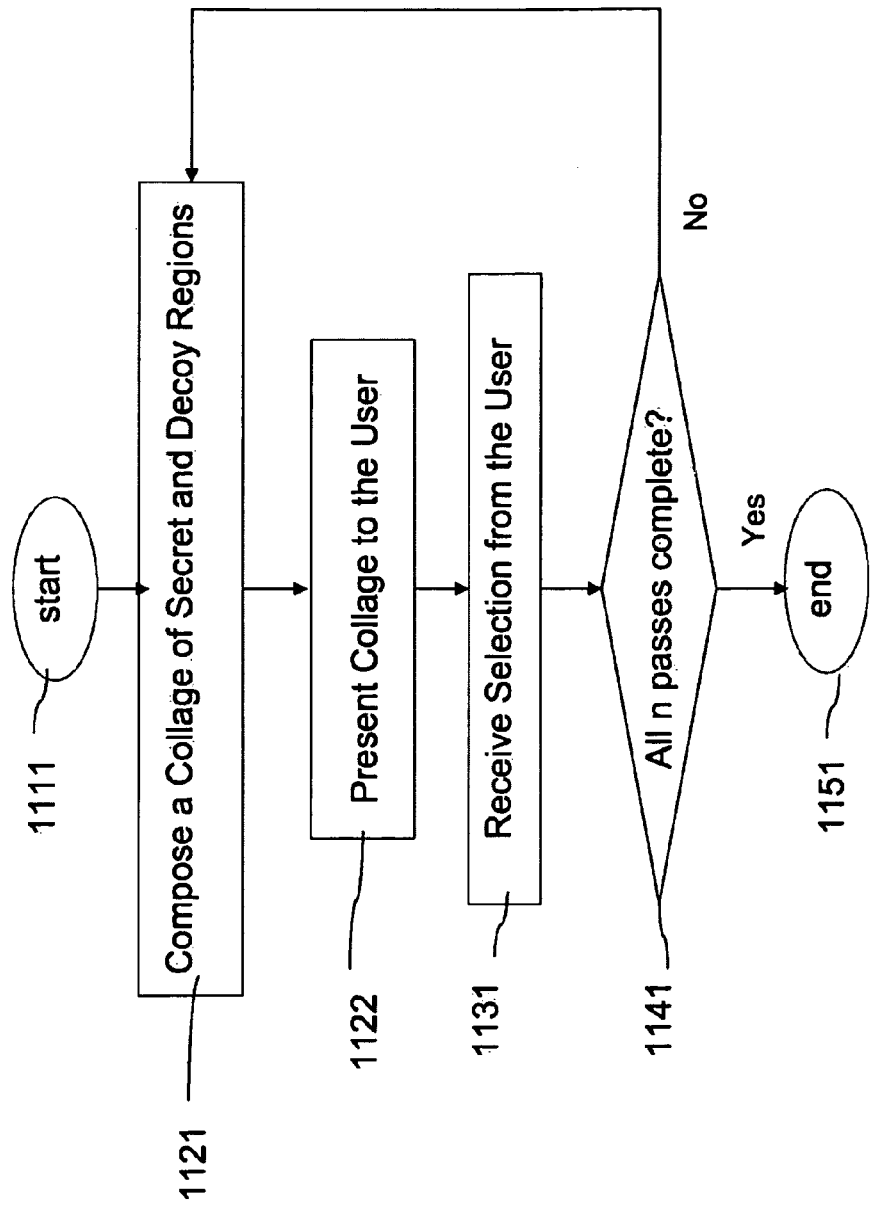
FIG. 11B shows a flow chart of a challenge and response phase according to aspects of the present invention.

FIG. 11B shows a flow chart of a challenge and response phase according to aspects of the present invention.

The method begins at 1111. At 1121, the system composes a collage including one secret region from a secret image and a number of regions from decoy images. At 1122 the collage is presented to the user. At 1131 a selection is received from the user. At 1141, it is determined if a predetermined and required number of passes are complete. If not, the method returns to 1121 where another collage is composed. If all required passes are complete, the method ends at 1151.

It is more secure to use one secret image only once and for subsequent passes use regions from other secret images. However, if the user is reluctant to memorize a number of secret images, several regions from the same secret image may be used.

Figure 12A:
FIG. 12A shows an exemplary challenge and response phase including four rounds of passes.

FIG. 12A shows an exemplary challenge and response phase including four rounds of passes.

Four rounds of passes are shown in FIG. 12A. In each of the four rounds 1201, 1202, 1203, and 1204, a different collage is presented to the user. In the example shown in FIG. 12A, the first pass 1201 and the second pass 1202 each present a collage including 10 regions to the user and one of the regions shown is the correct region from a secret image previously selected by the user. So, the probability of selecting the correct region by chance is $1/10$ in the first and the second pass. The third pass 1203 presents a collage including 11 regions with one of the regions being from a secret image previously selected by the user. The probability of guessing the correct region without having selected it yourself is $1/11$. The fourth pass 1204 is a collage of 12 regions with one being from a secret image and the probability of correctly guessing the correct region in this pass is $1/12$. So, the probability of correctly selecting all four secrets in the four rounds is $(1/10) \times (1/10) \times (1/11) \times (1/12)$ which is lower than probability of guessing a 4-digit PIN number at an ATM. These probabilities are approximate because they do not take into consideration various psychological factors that impact the independence of the variables.

In FIG. 12A, the secret image from which the secret region, that is used in the collage, is selected is shown to the right of each of the collages. Secret images 1211, 1212, 1213, 1214 each include one or more detected or selected regions. One region from each is selected by the user and used in the corresponding collage to the left. In this example, each secret image is used only once and two regions from the same image are not used in different passes of the same challenge and response phase.

FIG. 12B shows another exemplary challenge and response phase including four rounds of passes.

This figure uses caricatures instead of actual images for ease of illustration. Collages 1221, 1222, 1223 and 1224 include one secret region from a previously selected secret image 1231, 1232, 1233 and 1234, respectively, that are shown to the right of each collage. Each secret image 1231, 1232, 1233 and 1234 may have one or more regions identified in it by a person or by an algorithm. Each collage uses one region from one of the secret images and mixes this region with decoys to form the collage. The secret image is identified by an arrow on the drawing. The collages shown, each include 8 regions and the probability of a random correct guess is approximately $1/8$. The probability of selecting the correct region, without having seen the secret images before, is approximately $(1/8)^4$.

As mentioned earlier, the regions of each image are first scored. For example, the region with the smallest values of score $r_i$ is selected for collage rendering. Such a region gives little hint about existence of other regions of the image. Hence it does not give out the whole image.

In one alternative, the collage rendering scheme can be varied by selecting several regions with smaller scores, compared to the other regions, instead of selecting only the one region with the smallest score.

Each image, whether it is a secret or a decoy image, has its candidate regions to be rendered into the collage. In one aspect, the regions are arranged and rendered in the following manner. First, the system arranges the chosen regions, from the secret and decoy images, such that the arrangement conserves the available space and fits the regions tightly with a predefined aspect ratio that matches the aspect ratio of the display on which the collage shall be displayed. Second, the collage depends on the regions chosen for display by the system during each round of the challenge and response phase. Therefore, the collages presented to the user may be different for each authentication session. That is, regions from the same secret image and different decoy image combinations will yield different collages.

In one exemplary implementation, images were collected and hand picked to form a pool of images to be used by the authentication system. The collected images have similar coding quality and may be produced by various types of cameras. The collected images are clustered into multiple sets based on geographic information regarding the place where they were taken. However, clustering need not be constrained to geo-tagging methods. Clustering may be manual, automatic, or dynamic. Clustering helps the system in picking decoy images once a secret image is selected. Next, an algorithm may be used as the core engine to determine the regions in the images and generate collages automatically. Image analysis may be used to adopt other object detection and segmentation techniques to enhance the automatic region detection. In addition, various modifications of the region scoring and selection algorithm may be used. User psychology when using a system according to aspects of the present invention may impact the probabilities.

Unlike conventional methods and systems, which use the whole images or manually prepared images, the mechanism of the embodiments of the present invention uses partial images or regions of an image. The regions may be extracted and scored automatically, which simplifies the task for the user.

Unlike conventional methods and systems, which use fixed grid formats, the mechanism of the embodiments of the present invention does not assume a fixed row and column format. Rather, it determines the arrangement of regions not by random choice alone but by geometric properties. More recognizable image components can be fit onto the screen. This allows the system to compact more security relevant information on-screen. Further, the collage arrangement adds aesthetic taste to the arrangement and display of the images, which makes the user experience more pleasant.

Unlike conventional methods and systems, the mechanism of the embodiments of the present invention use regions from the same image during the challenge and response phase. This increases the security of the mechanism against shoulder surfing attacks because a region used in one round need not be used in the following rounds. A same region also appears differently in the collage since different regions from different sets of decoy images are used in generating the collage each time.

A user authentication system according to the aspects of the present invention may be implemented such that it is partially or entirely automatic. It does not require a long time to set up or for user training. In some aspects of the present invention, a user need not upload her own pictures or spend time selecting the region of interest in the images. Aspects of the present invention offer different choices of image scheme and a user can select one or combine the different schemes to suit her or her own preference.

A system according to aspects of the present invention may be used to replace or supplement alpha numeric user authentication systems. The collage could be rendered and presented differently on different devices and displays. Its compact nature is most suitable for mobile devices with a small screen, where selection of image is easier than typing on a keyboard.

FIG. 13 illustrates a first exemplary embodiment of a computer platform upon which the inventive system may be implemented.

The device 1300 may be a mobile telephone or a similar device including a screen 1310, where the collage is shown to a user, a keyboard 1320 for entering data and an antenna 1330 for transmitting and receiving information. The screen 1310 may be of the touch sensitive type and usable for entering data as well. The device 1300 includes ports and interfaces for input and output of collages.

Exemplary Computer Platform

Figure 14:
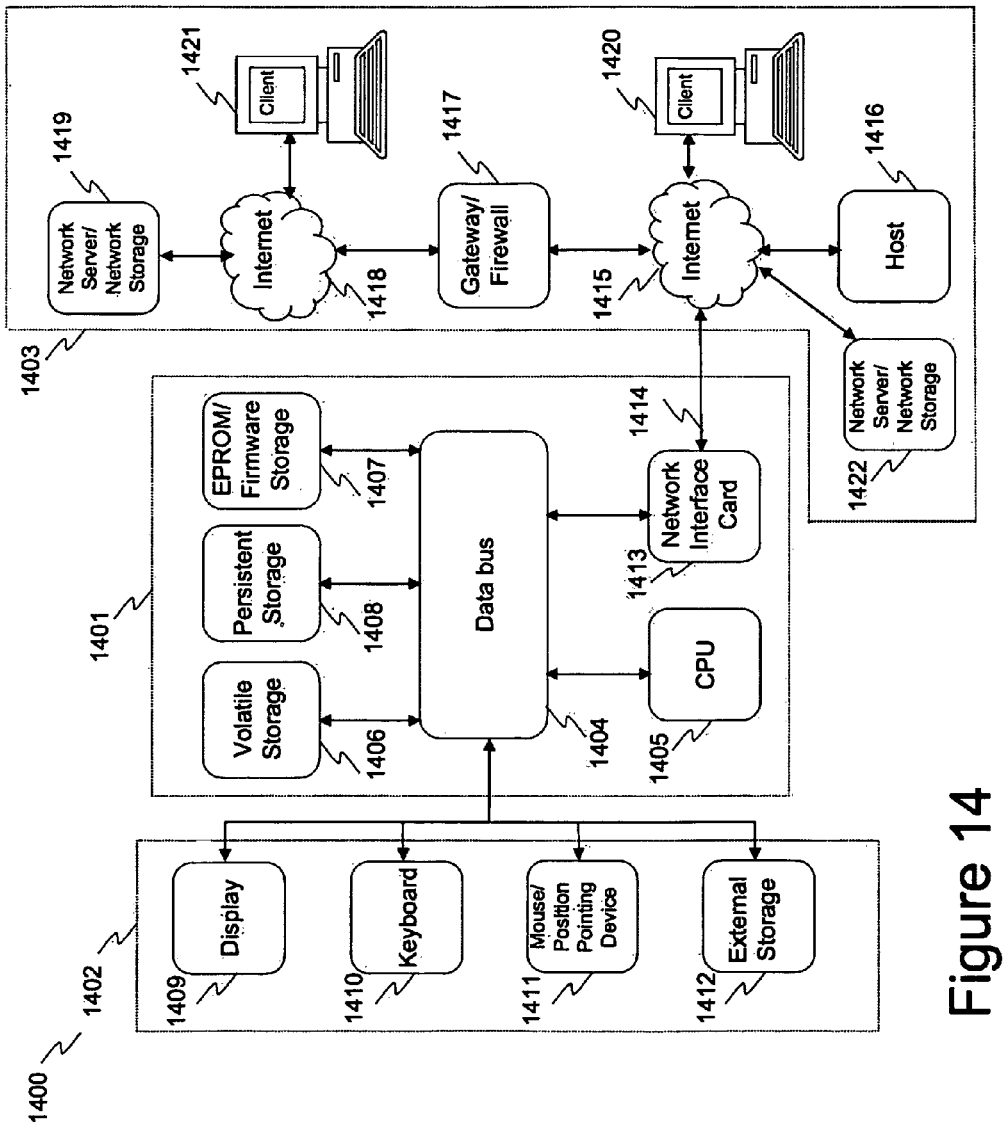
FIG. 14 illustrates a second exemplary embodiment of a computing platform upon which the inventive system may be implemented.

FIG. 14 is a block diagram that illustrates an embodiment of a computer/server system 1400 upon which an embodiment of the inventive methodology may be implemented. The system 1400 includes a computer/server platform 1401, peripheral devices 1402 and network resources 1403.

The computer platform 1401 may include a data bus 1404 or other communication mechanism for communicating information across and among various parts of the computer platform 1401, and a processor 1405 coupled with bus 1401 for processing information and performing other computational and control tasks. Computer platform 1401 also includes a volatile storage 1406, such as a random access memory (RAM) or other dynamic storage device, coupled to bus 1404 for storing various information as well as instructions to be executed by processor 1405. The volatile storage 1406 also may be used for storing temporary variables or other intermediate information during execution of instructions by processor 1405. Computer platform 1401 may further include a read only memory (ROM or EPROM) 1407 or other static storage device coupled to bus 1404 for storing static information and instructions for processor 1405, such as basic input-output system (BIOS), as well as various system configuration parameters. A persistent storage device 1408, such as a magnetic disk, optical disk, or solid-state flash memory device is provided and coupled to bus 1401 for storing information and instructions.

Computer platform 1401 may be coupled via bus 1404 to a display 1409, such as a cathode ray tube (CRT), plasma display, or a liquid crystal display (LCD), for displaying information to a system administrator or user of the computer platform 1401. An input device 1410, including alphanumeric and other keys, is coupled to bus 1401 for communicating information and command selections to processor 1405. Another type of user input device is cursor control device 1411, such as a mouse, a trackball, or cursor direction keys for communicating direction information and command selections to processor 1404 and for controlling cursor movement on display 1409. This input device typically has two degrees of freedom in two axes, a first axis (e.g., x) and a second axis (e.g., y), that allows the device to specify positions in a plane.

An external storage device 1412 may be connected to the computer platform 1401 via bus 1404 to provide an extra or removable storage capacity for the computer platform 1401. In an embodiment of the computer system 1400, the external removable storage device 1412 may be used to facilitate exchange of data with other computer systems.

The present invention is related to the use of computer system 1400 for implementing the techniques described herein. In an embodiment, the inventive system may reside on a machine such as computer platform 1401. According to one embodiment of the present invention, the techniques described herein are performed by computer system 1400 in response to processor 1405 executing one or more sequences of one or more instructions contained in the volatile memory 1406. Such instructions may be read into volatile memory 1406 from another computer-readable medium, such as persistent storage device 1408. Execution of the sequences of instructions contained in the volatile memory 1406 causes processor 1405 to perform the process steps described herein. In alternative embodiments, hard-wired circuitry may be used in place of or in combination with software instructions to implement the present invention. Thus, embodiments of the present invention are not limited to any specific combination of hardware circuitry and software.

The term "computer-readable medium" as used herein refers to any medium that participates in providing instructions to processor 1405 for execution. The computer-readable medium is just one example of a machine-readable medium, which may carry instructions for implementing any of the methods and/or techniques described herein. Such a medium may take many forms, including but not limited to, non-volatile media, volatile media, and transmission media. Non-volatile media includes, for example, optical or magnetic disks, such as storage device 1408. Volatile media includes dynamic memory, such as volatile storage 1406. Transmission media includes coaxial cables, copper wire and fiber optics, including the wires that comprise data bus 1404. Transmission media can also take the form of acoustic or light waves, such as those generated during radio-wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium. with patterns of holes, a RAM, a PROM, an EPROM, a FLASH-EPROM, a flash drive, a memory card, any other memory chip or cartridge, a carrier wave as described hereinafter, or any other medium from which a computer can read.

Various forms of computer readable media may be involved in carrying one or more sequences of one or more instructions to processor 705 for execution. For example, the instructions may initially be carried on a magnetic disk from a remote computer. Alternatively, a remote computer can load the instructions into its dynamic memory and send the instructions over a telephone line using a modem. A modem local to computer system 1400 can receive the data on the telephone line and use an infra-red transmitter to convert the data to an infra-red signal. An infra-red detector can receive the data carried in the infra-red signal and appropriate circuitry can place the data on the data bus 1404. The bus 1404 carries the data to the volatile storage 1406, from which processor 1405 retrieves and executes the instructions. The instructions received by the volatile memory 1406 may optionally be stored on persistent storage device 1408 either before or after execution by processor 1405. The instructions may also be downloaded into the computer platform 1401 via Internet using a variety of network data communication protocols well known in the art.

The computer platform 1401 also includes a communication interface, such as network interface card 1413 coupled to the data bus 1404. Communication interface 1413 provides a two-way data communication coupling to a network link 1414 that is connected to a local network 1415. For example, communication interface 1413 may be an integrated services digital network (ISDN) card or a modem to provide a data communication connection to a corresponding type of telephone line. As another example, communication interface 1413 may be a local area network interface card (LAN NIC) to provide a data communication connection to a compatible LAN. Wireless links, such as well-known 802.11a, 802.11b, 802.11g and Bluetooth may also be used for network implementation. In any such implementation, communication interface 1413 sends and receives electrical, electromagnetic or optical signals that carry digital data streams representing various types of information.

Network link 1413 typically provides data communication through one or more networks to other network resources. For example, network link 1414 may provide a connection through local network 1415 to a host computer 1416, or a network storage/server 1417. Additionally or alternatively, the network link 1413 may connect through gateway/firewall 1417 to the wide-area or global network 1418, such as an Internet. Thus, the computer platform 1401 can access network resources located anywhere on the Internet 1418, such as a remote network storage/server 1419. On the other hand, the computer platform 1401 may also be accessed by clients located anywhere on the local area network 1415 and/or the Internet 1418. The network clients 1420 and 1421 may themselves be implemented based on the computer platform similar to the platform 1401.

Local network 1415 and the Internet 1418 both use electrical, electromagnetic or optical signals that carry digital data streams. The signals through the various networks and the signals on network link 1414 and through communication interface 1413, which carry the digital data to and from computer platform 1401, are exemplary forms of carrier waves transporting the information.

Computer platform 1401 can send messages and receive data, including program code, through the variety of network(s) including Internet 1418 and LAN 1415, network link 1414 and communication interface 1413. In the Internet example, when the system 1401 acts as a network server, it might transmit a requested code or data for an application program running on client(s) 1420 and/or 1421 through Internet 1418, gateway/firewall 1417, local area network 1415 and communication interface 1413. Similarly, it may receive code from other network resources.

The received code may be executed by processor 1405 as it is received, and/or stored in persistent or volatile storage devices 1408 and 1406, respectively, or other non-volatile storage for later execution. In this manner, computer system 1401 may obtain application code in the form of a carrier wave.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, perl, shell, PHP, Java, etc.

Moreover, other implementations of the present invention will be apparent to those skilled in the art from consideration of the specification and practice of the present invention disclosed herein. Various aspects and/or components of the described embodiments may be used singly or in any combination in the inventive graphical authentication system. It is intended that the specification and examples be considered as exemplary only, with a true scope and spirit of the present invention being indicated by the following claims.

What is claimed is:

1. A method of forming a collage as a computerized graphical user authentication tool, the method being executed by a processor, the method comprising:
    constructing an image corpus;
    receiving a selection of a first image as secret image from the image corpus;
    retrieving images other than the secret image as decoy images from the image corpus;
    selecting one or more regions from the secret image as secrets, and one or more regions from the decoy images as decoys; and
    forming a collage including a first number of secrets and a second number of decoys,
    wherein forming the collage further comprises creating a single composite image comprising one or more regions from the secret image as secrets, and one or more regions from the decoy images as decoys;
    wherein each of the one or more regions from the secret image is less than the secret image in its entirety;
    wherein a region selected from a decoy image is less than the decoy image in its entirety;
    presenting the collage to a user for selection of a region of the collage;
    wherein authentication is denied in response to receiving a selection of a decoy in the collage.

2. The method of claim 1, wherein the image corpus is constructed to have homogenous image quality.

3. The method of claim 1, wherein the image corpus is selected from a set of images.

4. The method of claim 3, wherein the image corpus is selected from a set of images by discarding skewed images from the set of images.

5. The method of claim 3, wherein images selected from the set of images are filtered to homogenize image characteristics.

6. The method of claim 3, wherein images selected from the set of images are filtered to homogenize image resolution.

7. The method of claim 3, wherein images selected from the set of images are filtered to homogenize image coding quality.

8. The method of claim 1, wherein the decoy images are retrieved based on meta-information of images in the image corpus.

9. The method of claim 8, wherein the meta-information is selected from a group consisting of user-defined tags, location information, time information and image cluster information.

10. The method of claim 1, wherein the regions are selected automatically by image processing algorithms.

11. The method of claim 1, wherein the regions are selected by a user.

12. The method of claim 1, wherein the regions are selected by a community of users.

13. The method of claim 12, wherein the community of users cooperate through the Internet to select one or more regions from secret images, and select one or more regions from decoy images.

14. The method of claim 1, wherein the selecting one or more regions comprises:
   detecting regions from the secret image;
   detecting regions from the decoy image;
   selecting one or more regions from the secret image as secrets;
   selecting one or more regions from each decoy images as decoys;
   scoring each of the secrets according to information of the secret and relationship of the secret to other secrets in the secret image; and
   selecting one or more secrets according to the scores.

15. The method of claim 14, wherein the scoring each of the secrets according to information of the secret and relationship of the secret to other secrets in the secret image is responsive to:
   an amount of information revealed by the secret about the secret image as a whole, and
   an amount of information revealed by the secret about other secrets in the secret image.

16. The method of claim 14, wherein secrets revealing less information about other secrets in the secret image and about the secret image as determined from the scoring are selected.

17. The method of claim 14, wherein the secrets are scored according to one or more or a combination of scoring methods.

18. The method of claim 14, wherein the scoring is based on similarity of image characteristics of the secrets.

19. The method of claim 18, wherein the image characteristics comprise color and texture information.

20. The method of claim 14, wherein the scoring is based on neighborhood information of the secrets.

21. The method of claim 20, wherein the neighborhood information comprises a number of adjacent secrets.

22. The method of claim 20, wherein the neighborhood information comprises distances between the secrets.

23. The method of claim 20, wherein the neighborhood information comprises numbers of adjacent boundary pixels between pairs of the secrets.

24. The method of claim 14, wherein scoring each of the secrets further comprises analyzing regions from each of the secrets and preferring regions that are least related to other regions of the secret image.

25. The method of claim 1, wherein the first number of secrets and the second number of decoys formed in the collage are optimized for display size and number of regions displayed.

26. The method of claim 25, wherein the optimization is realized by bin-Packing algorithm.

27. The method of claim 25, wherein the optimization is realized by force-directed placement algorithm.

28. The method of claim 1, wherein the first number of secrets and the second number of decoys formed in the collage fit an aspect ratio of a display being used for displaying the collage.

29. A method of graphical user authentication, the method being executed by a processor, the method comprising:
   receiving a selection of a first set of images as secret images from a user;
   retrieving a set of images other than the first set of images as decoy images;
   selecting one or more regions within each secret image as secrets, and one or more regions within each decoy image as decoys;
   forming a collage including a first number of secrets and a second number of decoys;
   presenting a challenge to the user by requiring identification of a third number of secrets in the collage; and
   authenticating the user if the user correctly identifies a fourth number of secrets within a fifth number of challenges;
   wherein each of the one or more regions from said each secret image is less than the secret image in its entirety;
   wherein a region selected from a decoy image is less than the decoy image in its entirety;
   wherein authentication is denied in response to receiving a selection of a decoy in the collage.

30. The method of claim 29, further comprising before the authenticating:
   changing the selecting of secrets and decoys before presenting a different challenge to the user.

31. The method of claim 29, wherein the first number is one or more than one.

32. The method of claim 29, wherein the third number is smaller or equal to the first number.

33. The method of claim 29, wherein the fifth number is one or more than one.

34. The method of claim 29, wherein the fourth number is equal or greater than the third number.

35. A system for graphical user authentication comprising:
   a storage medium storing a corpus of images;
   a display displaying images in the corpus of images to a user;
   an input interface receiving a selection of images as secret images from the user; and
   a processor executing programs for:
   retrieving images other than the secret images from the storage medium as decoy images;
   selecting one or more regions within each secret image as secrets and one or more regions within each decoy image as decoys;
   forming a collage including a first number of secrets and a second number of decoys;
   presenting a challenge to the user on the display by requiring identification of a third number of secrets within the collage; and authenticating the user if the user correctly identify a fourth number of secrets within a fifth number of challenges through the input interface;

wherein each of the one or more regions from said each secret image is less than the secret image in its entirety;

wherein a region selected from a decoy image is less than the decoy image in its entirety;

wherein authentication is denied in response to receiving a selection of a decoy in the collage.

36. A method of user authentication, the method comprising:

selecting a region from a secret image as a secret, wherein the region selected from the secret image is less than the secret image in its entirety;

selecting a region from a decoy image as a decoy, wherein the region selected from the decoy image is less than the decoy image in its entirety;

forming a collage from the secret region of the secret image and the selected region of the decoy image;

presenting the collage to a user for selection of a region of the collage; and denying authentication in response to receiving a selection of a decoy in the collage;

wherein the selecting the region from the secret image comprises:

detecting regions from the secret image;

selecting one or more regions from the secret image as secrets;

scoring each of the secrets according to information of the secret and relationship of the secret to other secrets in the secret image; and selecting at least one secret according to the scores.

37. The method of claim 36, further comprising granting authentication in response to receiving a selection of the secret region in the collage.

* * * * *